(12) United States Patent
Hensley et al.

(10) Patent No.: US 10,787,805 B2
(45) Date of Patent: *Sep. 29, 2020

(54) FIRE AND/OR WATER RESISTANT EXPANSION AND SEISMIC JOINT SYSTEM

(71) Applicant: Emseal Joint Systems Ltd., Westborough, MA (US)

(72) Inventors: Lester Hensley, Westborough, MA (US); Bill Witherspoon, Guelph (CA)

(73) Assignee: EMSEAL JOINT SYSTEMS LTD., Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,196

(22) Filed: Jun. 26, 2017

(65) Prior Publication Data
US 2018/0016784 A1   Jan. 18, 2018

Related U.S. Application Data

(63) Continuation of application No. 14/455,403, filed on Aug. 8, 2014, now Pat. No. 9,689,158, which is a
(Continued)

(51) Int. Cl.
*E04B 1/68* (2006.01)
*E04B 1/94* (2006.01)
(Continued)

(52) U.S. Cl.
CPC ............ *E04B 1/68* (2013.01); *C09K 21/00* (2013.01); *E04B 1/6804* (2013.01);
(Continued)

(58) Field of Classification Search
CPC .......... E04B 1/6812; E04B 1/948; E04B 1/68; E04B 1/6806; E04B 1/66; E04B 1/6801;
(Continued)

(56) References Cited

U.S. PATENT DOCUMENTS 517,701 A     4/1894   Knower
945,914 A     4/1909   Colwell
(Continued)

FOREIGN PATENT DOCUMENTS

CA   1280007   4/1989
CA   1334268   8/1989
(Continued)

OTHER PUBLICATIONS www.stifirestop.com, Specified Technologies, Inc., Product Data Sheet, Series ES Elastomeric Sealant, Copyright 2004, pp. 1-4.
(Continued)

*Primary Examiner* — William V Gilbert
(74) *Attorney, Agent, or Firm* — MKG, LLC

(57) ABSTRACT

An expansion joint system includes a cover plate; a spline attached to the cover plate; and a core having a fire retardant material included therein in an amount effective to pass testing mandated by UL 2079. The spline depends from the cover plate and is configured to be positioned in a gap between substrates such that the cover plate overlies the gap. The core is compressible between a first face of the spline and one of the substrates and is compressible between a second face of the spline and the other of the substrates, and the expansion joint system is configured to facilitate compression of the core when installed between the substrates by repeatedly expanding and contracting to accommodate movement of the substrates; and the core with the fire retardant material included therein is configured to pass the testing mandated by UL 2079.

52 Claims, 8 Drawing Sheets

Related U.S. Application Data continuation of application No. 13/729,980, filed on Dec. 28, 2012, now Pat. No. 8,813,450, which is a continuation-in-part of application No. 12/730,354, filed on Mar. 24, 2010, now Pat. No. 8,341,908.

(60) Provisional application No. 61/162,820, filed on Mar. 24, 2009.

(51) Int. Cl.
    *C09K 21/00*     (2006.01)
    *E04B 1/98*     (2006.01)
    *E04C 2/20*     (2006.01)

(52) U.S. Cl.
    CPC .............. *E04B 1/6812* (2013.01); *E04B 1/94* (2013.01); *E04B 1/948* (2013.01); *E04B 1/98* (2013.01); *E04C 2/20* (2013.01)

(58) Field of Classification Search
    CPC ........ E04B 1/6803; E04B 1/6804; E04B 1/94; E04B 1/941; E04B 1/947; E04B 1/98; E04C 2/205; C09K 21/00
    USPC .... 52/395, 396.01, 465, 466, 467, 468, 232, 52/317, 393, 396.03, 396.04, 396.07, 52/396.06, 586.1, 586.2; 404/47, 68
    See application file for complete search history.

(56) References Cited

U.S. PATENT DOCUMENTS

| | | |
|---|---|---|
| 1,357,713 A | 11/1920 | Lane |
| 1,371,727 A | 3/1921 | Blickle |
| 1,428,881 A | 9/1922 | Dyar |
| 1,691,402 A | 11/1928 | Oden |
| 1,716,994 A | 6/1929 | Wehrle |
| 1,809,613 A | 6/1931 | Walker |
| 2,010,569 A | 8/1935 | Sitzler |
| 2,016,858 A | 10/1935 | Hall |
| 2,035,476 A | 3/1936 | Herwood |
| 2,152,189 A | 4/1936 | Henderson |
| 2,069,899 A | 2/1937 | Older |
| 2,190,532 A | 2/1940 | Lukomski |
| 2,240,787 A | 5/1941 | Kinzer |
| 2,271,180 A | 1/1942 | Brugger |
| 2,277,286 A | 3/1943 | Bechtner |
| 2,544,532 A | 3/1951 | Hill |
| 2,701,155 A | 2/1955 | Estel, Jr. |
| 2,776,865 A | 1/1957 | Anderson |
| 2,828,235 A | 3/1958 | Holland et al. |
| 2,954,592 A | 10/1960 | Parsons |
| 2,995,056 A | 10/1960 | Knox |
| 3,024,504 A | 3/1962 | Miller |
| 3,080,540 A | 3/1963 | McFarland |
| 3,111,069 A | 11/1963 | Farbish |
| 3,124,047 A | 3/1964 | Graham |
| 3,172,237 A | 3/1965 | Bradley |
| 3,194,846 A | 7/1965 | Blaga |
| 3,232,786 A | 2/1966 | Kellman |
| 3,244,130 A | 4/1966 | Hippie, Jr. |
| 3,245,328 A | 4/1966 | Fassbinder |
| 3,255,680 A | 6/1966 | Cooper et al. |
| 3,262,894 A | 7/1966 | Green |
| 3,289,374 A | 12/1966 | Metz |
| 3,298,653 A | 1/1967 | Omholt |
| 3,300,913 A | 1/1967 | Patry et al. |
| 3,302,690 A | 2/1967 | Hurd |
| 3,335,647 A | 8/1967 | Thorp, Jr. |
| 3,344,011 A | 9/1967 | Goozner |
| 3,352,217 A | 11/1967 | Peters et al. |
| 3,355,846 A | 12/1967 | Tillson |
| 3,363,383 A | 1/1968 | Barge |
| 3,371,456 A | 3/1968 | Balzer et al. |
| 3,372,521 A | 3/1968 | Thom |
| 3,378,958 A | 4/1968 | Parks et al. |
| 3,394,639 A | 7/1968 | Viehmann |
| 3,410,037 A | 11/1968 | Empson et al. |
| 3,435,574 A | 4/1969 | Hallock |
| 3,447,430 A | 6/1969 | Gausepohl |
| 3,470,662 A | 10/1969 | Kellman |
| 3,482,492 A | 12/1969 | Bowman |
| 3,543,459 A | 12/1970 | Mills |
| 3,551,009 A | 12/1970 | Cammuso et al. |
| 3,575,372 A | 4/1971 | Emberson |
| 3,582,095 A | 6/1971 | Bogaert et al. |
| 3,603,048 A | 9/1971 | Hadfield |
| 3,604,322 A | 9/1971 | Koster |
| 3,606,826 A | 9/1971 | Bowman |
| 3,629,986 A | 12/1971 | Klittich |
| 3,643,388 A | 2/1972 | Parr et al. |
| 3,659,390 A | 5/1972 | Balzer et al. |
| 3,670,470 A | 6/1972 | Thom |
| 3,672,707 A | 6/1972 | Russo et al. |
| 3,677,145 A | 7/1972 | Wattiez |
| 3,694,976 A | 10/1972 | Warshaw |
| 3,712,188 A | 1/1973 | Worson |
| 3,720,142 A | 3/1973 | Pare |
| 3,724,155 A | 4/1973 | Reeve |
| 3,736,713 A | 6/1973 | Flachbarth et al. |
| 3,742,669 A | 7/1973 | Mansfeld |
| 3,745,726 A | 7/1973 | Thom |
| 3,750,359 A | 8/1973 | Balzer et al. |
| 3,760,544 A | 9/1973 | Hawes et al. |
| 3,797,188 A | 3/1974 | Mansfeld |
| 3,849,958 A | 11/1974 | Balzer et al. |
| 3,856,839 A | 12/1974 | Smith et al. |
| 3,871,787 A | 3/1975 | Stegmeier |
| 3,880,539 A | 4/1975 | Brown |
| 3,883,475 A | 5/1975 | Racky et al. |
| 3,896,511 A | 7/1975 | Cuschera |
| 3,907,443 A | 9/1975 | McLean |
| 3,911,635 A | 10/1975 | Traupe |
| 3,934,905 A | 1/1976 | Lockard |
| 3,944,704 A | 3/1976 | Dirks |
| 3,951,562 A | 4/1976 | Fyfe |
| 3,956,557 A | 5/1976 | Hurst |
| 3,974,609 A | 8/1976 | Attaway |
| 4,007,994 A | 2/1977 | Brown |
| 4,018,017 A | 4/1977 | Schoop |
| 4,018,539 A | 4/1977 | Puccio |
| 4,022,538 A | 5/1977 | Watson et al. |
| 4,030,156 A | 6/1977 | Raymond |
| 4,055,925 A | 11/1977 | Wasserman et al. |
| 4,058,947 A | 11/1977 | Earle et al. |
| 4,066,578 A | 1/1978 | Murch et al. |
| 4,129,967 A | 12/1978 | Barlow |
| 4,132,491 A | 1/1979 | Scheffel |
| 4,134,875 A | 1/1979 | Tapia |
| 4,140,419 A | 2/1979 | Puccio |
| 4,143,088 A | 3/1979 | Favre et al. |
| 4,146,939 A | 4/1979 | Izzi |
| 4,174,420 A | 11/1979 | Anolick et al. |
| 4,181,711 A | 1/1980 | Ohashi et al. |
| 4,204,856 A | 5/1980 | Yigdall et al. |
| 4,216,261 A | 8/1980 | Dias |
| 4,221,502 A | 9/1980 | Tanikawa |
| 4,224,374 A | 9/1980 | Priest |
| 4,237,182 A | 12/1980 | Fulmer et al. |
| 4,245,925 A | 1/1981 | Pyle |
| 4,246,313 A | 1/1981 | Stengle, Jr. |
| 4,258,606 A | 3/1981 | Wilson |
| 4,270,318 A | 6/1981 | Carroll et al. |
| 4,271,650 A | 6/1981 | Lynn-Jones |
| 4,288,559 A | 9/1981 | Illger et al. |
| 4,290,249 A | 9/1981 | Mass |
| 4,290,713 A | 9/1981 | Brown et al. |
| 4,295,311 A | 10/1981 | Dahlberg |
| 4,305,680 A | 12/1981 | Rauchfuss, Jr. |
| 4,320,611 A | 3/1982 | Freeman |
| 4,359,847 A | 11/1982 | Schukolinski |
| 4,362,428 A | 12/1982 | Kerschner |
| 4,367,976 A | 1/1983 | Bowman |
| 4,374,207 A | 2/1983 | Stone et al. |

(56) References Cited

U.S. PATENT DOCUMENTS

| | | |
|---|---|---|
| 4,374,442 A | 2/1983 | Hein et al. |
| 4,401,716 A | 8/1983 | Tschudin-Mahrer |
| 4,424,956 A | 1/1984 | Grant et al. |
| 4,431,691 A | 2/1984 | Greenlee |
| 4,432,465 A | 2/1984 | Wuertz |
| 4,433,732 A | 2/1984 | Licht et al. |
| 4,447,172 A | 5/1984 | Galbreath |
| 4,453,360 A | 6/1984 | Barenberg |
| 4,455,396 A | 6/1984 | Al-Tabaqchall et al. |
| 4,473,015 A | 9/1984 | Hounsel |
| 4,486,994 A | 12/1984 | Fisher et al. |
| 4,494,762 A | 1/1985 | Geipel |
| 4,533,278 A | 8/1985 | Corsover et al. |
| 4,558,875 A | 12/1985 | Yamaji et al. |
| 4,564,550 A | 1/1986 | Tschudin-Mahrer |
| 4,566,242 A | 1/1986 | Dunsworth |
| 4,576,841 A | 3/1986 | Lingemann |
| 4,589,242 A | 5/1986 | Moulinie et al. |
| 4,615,411 A | 10/1986 | Breitscheidel et al. |
| 4,620,330 A | 11/1986 | Izzi, Sr. |
| 4,620,407 A | 11/1986 | Schmid |
| 4,622,251 A | 11/1986 | Gibb |
| 4,637,085 A | 1/1987 | Hartkorn |
| 4,687,829 A | 8/1987 | Chaffee et al. |
| 4,693,652 A | 9/1987 | Sweeney |
| 4,711,928 A | 12/1987 | Lee et al. |
| 4,717,050 A | 1/1988 | Wright |
| 4,745,711 A | 5/1988 | Box |
| 4,751,024 A | 6/1988 | Shu et al. |
| 4,756,945 A | 7/1988 | Gibb |
| 4,767,655 A | 8/1988 | Tschudin-Mahrer |
| 4,773,791 A | 9/1988 | Hartkorn |
| 4,780,571 A | 10/1988 | Huang |
| 4,781,003 A | 11/1988 | Rizza |
| 4,784,516 A | 11/1988 | Cox |
| 4,791,773 A | 12/1988 | Taylor |
| 4,807,843 A | 2/1989 | Courtois et al. |
| 4,815,247 A | 3/1989 | Nicholas |
| 4,824,283 A | 4/1989 | Belangie |
| 4,835,130 A | 5/1989 | Box |
| 4,839,223 A | 6/1989 | Tschudin-Mahrer |
| 4,848,044 A | 7/1989 | LaRoche et al. |
| 4,849,223 A | 7/1989 | Pratt et al. |
| 4,866,898 A | 9/1989 | LaRoche et al. |
| 4,879,771 A | 11/1989 | Piskula |
| 4,882,890 A | 11/1989 | Rizza |
| 4,885,885 A | 12/1989 | Gottschling |
| 4,893,448 A | 1/1990 | McCormick |
| 4,901,488 A | 2/1990 | Murota et al. |
| 4,911,585 A | 3/1990 | Vidal et al. |
| 4,916,878 A | 4/1990 | Nicholas |
| 4,920,725 A | 5/1990 | Gore |
| 4,927,291 A | 5/1990 | Belangie |
| 4,932,183 A | 6/1990 | Coulston |
| 4,942,710 A | 7/1990 | Rumsey |
| 4,952,615 A | 8/1990 | Welna |
| 4,957,798 A | 9/1990 | Bogdany |
| 4,965,976 A | 10/1990 | Riddle |
| 4,977,018 A | 12/1990 | Irrgeher et al. |
| 4,992,481 A | 2/1991 | von Bonin et al. |
| 5,007,765 A | 4/1991 | Dietlein et al. |
| 5,013,377 A | 5/1991 | Lafond |
| 5,024,554 A | 6/1991 | Benneyworth et al. |
| 5,026,609 A | 6/1991 | Jacob et al. |
| 5,035,097 A | 7/1991 | Cornwall |
| 5,053,442 A | 10/1991 | Chu et al. |
| 5,060,439 A | 10/1991 | Clements et al. |
| 5,071,282 A | 12/1991 | Brown |
| 5,072,557 A | 12/1991 | Naka et al. |
| 5,082,394 A | 1/1992 | George |
| 5,094,057 A | 3/1992 | Morris |
| 5,115,603 A | 5/1992 | Blair |
| 5,120,584 A | 6/1992 | Ohlenforst et al. |
| 5,121,579 A | 6/1992 | Hamar et al. |
| 5,129,754 A | 7/1992 | Brower |
| 5,130,176 A | 7/1992 | Baerveldt |
| 5,137,937 A | 8/1992 | Huggard et al. |
| 5,140,797 A | 8/1992 | Gohike et al. |
| 5,168,683 A | 12/1992 | Sansom et al. |
| 5,173,515 A | 12/1992 | von Bonin et al. |
| 5,190,395 A | 3/1993 | Cathey et al. |
| 5,209,034 A | 5/1993 | Box et al. |
| 5,213,441 A | 5/1993 | Baerveldt |
| 5,222,339 A | 6/1993 | Hendrickson et al. |
| 5,249,404 A | 10/1993 | Leek et al. |
| 5,270,091 A | 12/1993 | Krysiak et al. |
| 5,297,372 A | 3/1994 | Nicholas |
| 5,327,693 A | 7/1994 | Schmid |
| 5,335,466 A | 8/1994 | Langohr |
| 5,338,130 A | 8/1994 | Baerveldt |
| 5,354,072 A | 10/1994 | Nicholson |
| 5,365,713 A | 11/1994 | Nicholas et al. |
| 5,367,850 A | 11/1994 | Nicholas |
| 5,380,116 A | 1/1995 | Colonias |
| 5,436,040 A | 7/1995 | Lafond |
| 5,441,779 A | 8/1995 | Lafond |
| 5,443,871 A | 8/1995 | Lafond |
| 5,450,806 A | 9/1995 | Jean |
| 5,456,050 A | 10/1995 | Ward |
| 5,472,558 A | 12/1995 | Lafond |
| 5,479,745 A | 1/1996 | Kawai et al. |
| 5,485,710 A | 1/1996 | Lafond |
| 5,489,164 A | 2/1996 | Tusch et al. |
| 5,491,953 A | 2/1996 | Lafond |
| 5,498,451 A | 3/1996 | Lafond |
| 5,501,045 A | 3/1996 | Wexler |
| 5,508,321 A | 4/1996 | Brebner |
| 5,528,867 A | 6/1996 | Thompson |
| RE35,291 E | 7/1996 | Lafond |
| 5,572,920 A | 11/1996 | Kennedy et al. |
| 5,607,253 A | 3/1997 | Almstrom |
| 5,611,181 A | 3/1997 | Shreiner et al. |
| 5,616,415 A | 4/1997 | Lafond |
| 5,628,857 A | 5/1997 | Baerveldt |
| 5,635,019 A | 6/1997 | Lafond |
| 5,649,784 A | 7/1997 | Ricaud et al. |
| 5,650,029 A | 7/1997 | Lafond |
| 5,656,358 A | 8/1997 | Lafond |
| 5,658,645 A | 8/1997 | Lafond |
| 5,664,906 A | 9/1997 | Baker et al. |
| 5,680,738 A | 10/1997 | Allen et al. |
| 5,686,174 A | 11/1997 | Irrgeher |
| 5,691,045 A | 11/1997 | Lafond |
| 5,744,199 A † | 4/1998 | Joffre |
| 5,759,665 A | 6/1998 | Lafond |
| 5,762,738 A | 6/1998 | Lafond |
| 5,765,332 A | 6/1998 | Landin et al. |
| 5,773,135 A | 6/1998 | Lafond |
| 5,791,111 A | 8/1998 | Beenders |
| 5,806,272 A | 9/1998 | Lafond |
| 5,813,191 A | 9/1998 | Gallagher |
| 5,830,319 A | 11/1998 | Landin |
| 5,851,609 A | 12/1998 | Baratuci et al. |
| 5,875,598 A | 3/1999 | Batten et al. |
| 5,876,554 A | 3/1999 | Lafond |
| 5,878,448 A | 3/1999 | Molter |
| 5,887,400 A | 3/1999 | Bratek et al. |
| 5,888,341 A | 3/1999 | Lafond |
| 5,935,695 A | 8/1999 | Baerveldt |
| 5,957,619 A | 9/1999 | Kinoshita et al. |
| 5,974,750 A | 11/1999 | Landin et al. |
| 5,975,181 A | 11/1999 | Lafond |
| 6,001,453 A | 12/1999 | Lafond |
| 6,014,848 A | 1/2000 | Hillburn, Jr. |
| 6,035,536 A | 3/2000 | Dewberry |
| 6,035,587 A | 3/2000 | Dressler |
| 6,035,602 A | 3/2000 | Lafond |
| 6,039,503 A | 3/2000 | Cathey |
| D422,884 S | 4/2000 | Lafond |
| 6,088,972 A | 6/2000 | Johanneck |
| 6,102,407 A | 8/2000 | Moriya et al. |
| 6,115,980 A | 9/2000 | Knak et al. |
| 6,115,989 A | 9/2000 | Boone et al. |
| 6,128,874 A | 10/2000 | Olson et al. |

(56) References Cited

U.S. PATENT DOCUMENTS

| | | | |
|---|---|---|---|
| 6,131,352 | A | 10/2000 | Barnes et al. |
| 6,131,364 | A | 10/2000 | Peterson |
| 6,131,368 | A | 10/2000 | Tramposch et al. |
| 6,138,427 | A | 10/2000 | Houghton |
| 6,148,890 | A | 11/2000 | Lafond |
| 6,158,915 | A | 12/2000 | Kise |
| 6,189,573 | B1 | 2/2001 | Ziehm |
| 6,192,652 | B1 | 2/2001 | Goer et al. |
| 6,207,085 | B1 | 3/2001 | Ackerman |
| 6,207,089 | B1 | 3/2001 | Chuang |
| 6,219,982 | B1 | 4/2001 | Eyring |
| 6,237,303 | B1 | 5/2001 | Allen et al. |
| 6,250,358 | B1 | 6/2001 | Lafond |
| 6,253,514 | B1 | 7/2001 | Jobe et al. |
| 6,329,030 | B1 | 12/2001 | Lafond |
| 6,350,373 | B1 | 2/2002 | Sondrup |
| 6,351,923 | B1 | 3/2002 | Peterson |
| 6,355,328 | B1 | 3/2002 | Baratuci et al. |
| 6,368,670 | B1 | 4/2002 | Frost et al. |
| 6,419,237 | B1 | 7/2002 | More |
| 6,439,817 | B1 | 8/2002 | Reed |
| 6,443,495 | B1 | 9/2002 | Harmeling |
| 6,460,214 | B1 | 10/2002 | Chang |
| 6,491,468 | B1 | 12/2002 | Hagen |
| 6,499,265 | B2 | 12/2002 | Shreiner |
| 6,532,708 | B1 | 3/2003 | Baerveldt |
| 6,544,445 | B1 | 4/2003 | Graf et al. |
| 6,552,098 | B1 | 4/2003 | Bosch et al. |
| 6,574,930 | B2 | 6/2003 | Kiser |
| 6,581,341 | B1 | 6/2003 | Baratuci et al. |
| 6,598,634 | B1 | 7/2003 | Pelles |
| 6,665,995 | B2 | 12/2003 | Deane |
| 6,666,618 | B1 | 12/2003 | Anaya et al. |
| 6,685,196 | B1 | 2/2004 | Baerveldt |
| 6,820,382 | B1 | 11/2004 | Chambers et al. |
| 6,860,074 | B2 | 3/2005 | Stanchfield |
| 6,862,863 | B2 | 3/2005 | McCorkle et al. |
| 6,877,292 | B2 | 4/2005 | Baratuci et al. |
| 6,897,169 | B2 | 5/2005 | Matsui et al. |
| 6,905,650 | B2 | 6/2005 | McIntosh et al. |
| 6,948,287 | B2 | 9/2005 | Korn |
| 6,989,188 | B2 | 1/2006 | Brunnhofer et al. |
| 6,996,944 | B2 | 2/2006 | Shaw |
| 7,043,880 | B2 | 5/2006 | Morgan et al. |
| 7,070,653 | B2 | 7/2006 | Frost et al. |
| 7,090,224 | B2 | 8/2006 | Iguchi et al. |
| 7,101,614 | B2 | 9/2006 | Anton et al. |
| 7,114,899 | B2 | 10/2006 | Gass et al. |
| 7,210,557 | B2 | 5/2007 | Phillips et al. |
| 7,222,460 | B2 | 5/2007 | Francies, III et al. |
| 7,225,824 | B2 | 6/2007 | West et al. |
| 7,240,905 | B1 | 7/2007 | Stahl, Sr. |
| 7,278,450 | B1 | 10/2007 | Condon |
| 7,287,738 | B2 | 10/2007 | Pitlor |
| 7,441,375 | B2 | 10/2008 | Lang |
| 7,621,731 | B2 | 11/2009 | Armantrout et al. |
| 7,665,272 | B2 | 2/2010 | Reen |
| 7,678,453 | B2 | 3/2010 | Ohnstad et al. |
| 7,748,310 | B2 | 7/2010 | Kennedy |
| 7,757,450 | B2 | 7/2010 | Reyes et al. |
| 7,836,659 | B1 | 11/2010 | Barnes |
| 7,856,781 | B2 | 12/2010 | Hilburn, Jr. |
| 7,877,958 | B2 | 2/2011 | Baratuci et al. |
| 7,941,981 | B2 | 5/2011 | Shaw |
| 8,033,073 | B1 | 10/2011 | Binder |
| 8,079,190 | B2 | 12/2011 | Hilburn, Jr. |
| 8,171,590 | B2 | 5/2012 | Kim |
| 8,172,938 | B2 | 5/2012 | Alright et al. |
| 8,317,444 | B1 | 11/2012 | Hensley |
| 8,333,532 | B2 | 12/2012 | Derrigan et al. |
| 8,341,908 | B1 | 1/2013 | Hensley et al. |
| 8,365,495 | B1 | 2/2013 | Witherspoon |
| 8,397,453 | B2 | 3/2013 | Shaw |
| 8,601,760 | B2 | 12/2013 | Hilburn, Jr. |
| 8,720,138 | B2 | 5/2014 | Hilburn, Jr. |
| 8,739,495 | B1 | 6/2014 | Witherspoon |
| 8,813,449 | B1 | 8/2014 | Hensley et al. |
| 8,813,450 | B1 | 8/2014 | Hensley et al. |
| 9,068,297 | B2 | 6/2015 | Hensley et al. |
| 9,200,437 | B1 | 12/2015 | Hensley et al. |
| 2002/0052425 | A1 | 5/2002 | Kaku et al. |
| 2002/0088192 | A1 | 7/2002 | Calixto |
| 2002/0095908 | A1 | 7/2002 | Kiser |
| 2002/0113143 | A1 | 8/2002 | Frost et al. |
| 2002/0193552 | A1 | 12/2002 | Kiuchi et al. |
| 2003/0005657 | A1 | 1/2003 | Visser et al. |
| 2003/0110723 | A1 | 6/2003 | Baerveldt |
| 2003/0213211 | A1 | 11/2003 | Morgan et al. |
| 2004/0020162 | A1 | 2/2004 | Baratuci et al. |
| 2004/0024077 | A1 | 2/2004 | Braun et al. |
| 2004/0045234 | A1 | 3/2004 | Morgan et al. |
| 2004/0101672 | A1 | 5/2004 | Anton et al. |
| 2004/0113390 | A1 | 6/2004 | Broussard, III |
| 2004/0163724 | A1 | 8/2004 | Trabbold et al. |
| 2005/0005553 | A1 | 1/2005 | Baerveldt |
| 2005/0066600 | A1 | 3/2005 | Moulton et al. |
| 2005/0095066 | A1 | 5/2005 | Warren |
| 2005/0120660 | A1 | 6/2005 | Kim et al. |
| 2005/0136761 | A1* | 6/2005 | Murakami ............... B32B 5/26 442/59 |
| 2005/0155305 | A1 | 7/2005 | Cosenza et al. |
| 2005/0193660 | A1 | 9/2005 | Mead |
| 2005/0222285 | A1 | 10/2005 | Massengill et al. |
| 2006/0010817 | A1 | 1/2006 | Shull |
| 2006/0030227 | A1 | 2/2006 | Hairston et al. |
| 2006/0117692 | A1 | 6/2006 | Trout |
| 2006/0178064 | A1 | 8/2006 | Balthes et al. |
| 2007/0059516 | A1 | 3/2007 | Vincent et al. |
| 2007/0137135 | A1 | 6/2007 | Shymkowich |
| 2007/0199267 | A1 | 8/2007 | Moor |
| 2007/0261342 | A1 | 11/2007 | Cummings |
| 2008/0172967 | A1 | 7/2008 | Hilburn |
| 2008/0193738 | A1 | 8/2008 | Hensley et al. |
| 2008/0268231 | A1 | 10/2008 | Deib |
| 2009/0036561 | A1 | 2/2009 | Nygren |
| 2009/0223150 | A1 | 9/2009 | Baratuci et al. |
| 2009/0223159 | A1 | 9/2009 | Colon |
| 2009/0246498 | A1 | 10/2009 | Deiss |
| 2009/0315269 | A1 | 12/2009 | Deiss |
| 2010/0058696 | A1 | 3/2010 | Mills |
| 2010/0275539 | A1 | 11/2010 | Shaw |
| 2010/0281807 | A1 | 11/2010 | Bradford |
| 2010/0319287 | A1 | 12/2010 | Shaw |
| 2011/0016808 | A1 | 1/2011 | Hulburn, Jr. |
| 2011/0083383 | A1 | 4/2011 | Hilburn, Jr. |
| 2011/0088342 | A1 | 4/2011 | Stahl, Sr. et al. |
| 2011/0135387 | A1 | 6/2011 | Derrigan et al. |
| 2011/0247281 | A1 | 10/2011 | Pilz et al. |
| 2012/0117900 | A1 | 5/2012 | Shaw |
| 2014/0151968 | A1 | 6/2014 | Hensley et al. |
| 2014/0219719 | A1 | 8/2014 | Hensley et al. |
| 2014/0360118 | A1 | 12/2014 | Hensley et al. |
| 2018/0016784 | A1† | 1/2018 | Hensley |

FOREIGN PATENT DOCUMENTS

| | | | |
|---|---|---|---|
| CA | 1259351 | A | 9/1989 |
| CA | 1280007 | | 2/1991 |
| CA | 2256660 | A1 | 2/2000 |
| CA | 2296779 | C | 11/2006 |
| CA | 2640007 | A1 | 3/2009 |
| DE | 4436280 | A1 | 4/1996 |
| DE | 19809973 | C1 | 7/1999 |
| DE | 102005054375 | A1 | 5/2007 |
| EP | 0976882 | A2 | 2/1999 |
| EP | 0942107 | A2 | 9/1999 |
| EP | 1118715 | A1 | 7/2001 |
| EP | 1118726 | A1 | 7/2001 |
| EP | 1540220 | | 2/2004 |
| EP | 1540220 | B1 | 8/2006 |
| EP | 1983119 | A1 | 4/2007 |
| EP | 1983119 | B1 | 10/2008 |
| GB | 977929 | | 12/1964 |
| GB | 1359734 | | 7/1974 |

(56) References Cited

FOREIGN PATENT DOCUMENTS

| | | |
|---|---|---|
| GB | 1495721 | 12/1977 |
| GB | 1519795 | 8/1978 |
| GB | 2181093 A | 4/1987 |
| GB | 2251623 A1 | 7/1992 |
| GB | 2359265 A | 8/2001 |
| GB | 2377379 A | 1/2003 |
| JP | 200645950 A | 2/2006 |
| WO | 2003006109 A1 | 1/2003 |
| WO | 2007023118 A2 | 3/2007 |
| WO | 2007024246 A1 | 3/2007 |

OTHER PUBLICATIONS www.stifirestop.com, Specified Technologies, Inc., Product Data Sheet, Pensil PEN300 Silicone Sealant, Copyright 2004, pp. 1-4.
Snapshot of Office Action issued in U.S. Appl. No. 14/540514; printed in 2015, 22 pages.
Iso-Chemie, ISO BLOCO 600 solukumitiiviste, Finnish language, pp. 1-2; publication date unknown from document.
Iso-Chemie, ISO BLOCO 600, Produktbeskrivelse, Norwegian language, pp. 1-2, publication date unknown from document.
Ashida, Polyurethane and Related Foams, Chapter three: Fundamentals, p. 43, 45. pp. 1-3; publication date unknown from document.
Merritt, Protection against Hazards, Section 3.30-3.31, 1994, pp. 1-4.
Schultz, Fire and Flammability Handbook, p. 363, 1985, pp. 1-3.
Netherlands Standards Institute, Fire resistance tests for non-loadbearing elements—Part 1: Walls, Aug. 1999, NEN-EN 1364-1, pp. 1-32.
Troitzsch, Jurgen, International plastics flammability handbook, 1983, pp. 1-2.
Polytite Manufacturing Company, Polytite "R" Colorized Joint Sealant, Jan. 7, 1998, pp. 1-2.
Quelfire, Passive Fire Protection Products, catalog, pp. 1-68, publication date unknown from document.
Quelfire, Intufoam, pp. 1-4, publication date unknown from document.
Saint-Gobain Performance Plastics, Norseal V740, labeled Copyright 2001, pp. 1-2.
Sandell Manufacturing Company, Inc., Polytite Sealant and Construction Gasket, p. 1, publication date unknown from document.
Schul International Corporation, Hydrostop, Expansion Joint System, Jan. 17, 2001, pp. 1-2.
Illbruck, Sealtite-willseal, Plant Bodenwohr, pp. 1-17, publication date unknown from document.
Schul International Co., LLC., Sealtite "B" Type II, Part of the S3 Sealant System, Jan. 5, 2006, pp. 1-2.
Sealtite-willseal Joint Sealants, Equivalency Chart for Joint Sealants, p. 1, publication date unknown from document.
Schul International Co., LLC., Material Safety Data Sheet, Seismic Sealtite, revised date Oct. 23, 2002, pp. 1-3.
Sealtite-Willseal, Installation Procedures for Seismic Sealtite/250C Joint Sealant, Mar. 4, 2001, p. 1.
Tremco Illbruck Ltd., Technical Data Sheet, ALFASIL FR, Issue 3, pp. 1-2, Oct. 22, 2007.
Product Data Sheet, Art. No. 4.22.01 Compriband MPA, pp. 1-2, publication date unknown from document.
UL Online Certifications Directory, XHBN.GuideInfo, Joint Systems, last updated Sep. 21, 2013, pp. 1-4.
UL 1715 Fire Test of Interior Finish Material, http://ulstandardsinfonet.ul.com/scopes/1715.html[Oct. 7, 2014 3:27:15 PM], p. 1, publication date unknown from document.
Williams Products, Inc., Williams Everlastic 1715 Fire Classified Closures Tech Data, Oct. 2005, p. 1.
Williams Products, Inc., Everlastic Fire Classifed Closures 1715, http://williamsproducts.net/fire_classified_1715.html [Oct. 7, 2014 3:26:33 PM], pp. 1-3, publication date unknown from document.
Williams Products, Inc., Installation for partion closures, p. 1, publication date unknown from document.
Will-Seal Construction Foams, Will-seal is Tested to Perform, p. 1, publication date unknown from document.
Will-Seal Precompressed Foam Sealant, How Will-Seal Works, p. 1, publication date unknown from document.
Illbruck, Will-Seal, Basis of Acceptance, 3.0 Construction Requirements, Precompressed Foam Sealants, Section 07915, pp. 1-8, publication date unknown from document.
Emseal Joint Systems, Ltd., Emseal Colorseal Tech Data, Jul. 2009, p. 1-2.
Emseal Joint Systems, Ltd., Emseal Colorseal Tech Data, Mar. 2011, p. 1-2.
Emseal Joint Systems, Ltd., Emseal Horizontal Colorseal Tech Data, Aug. 2014, p. 1-2.
Emseal Joint Systems, Ltd., Emseal Seismic Colorseal Tech Data, Oct. 2009, pp. 1-2.
Emseal Joint Systems, Ltd., Emseal Seismic Colorseal Tech Data, Jun. 2010, pp. 1-2.
Emseal Joint Systems, Ltd., Emseal MST, Multi-Use Sealant Tape, Sep. 2008, pp. 1-2.
Emseal Joint Systems, Ltd., Emseal MST, Multi-Use Sealant Tape, Oct. 2013, pp. 1-2.
Emseal Joint Systems, Ltd., Emshield DFR2 System, Tech Data, Sep. 2014, pp. 1-4.
Emseal Joint Systems, Ltd., Emshield DFR2, last modified Sep. 19, 2014, pp. 1-4.
Emseal Joint Systems, Ltd., Emshield DFR3, last modified Sep. 4, 2014, pp. 1-5.
Emseal Joint Systems, Ltd., Emshield WFR2 and WFR3, last modified Sep. 3, 2014, pp. 1-5.
Emseal Joint Systems, Ltd., Colorseal-on-a-reel, last modified Nov. 10, 2014, pp. 1-3.
Emseal Joint Systems, Ltd., Colorseal, last modified Oct. 9, 2014, pp. 1-3.
Emseal GreyFlex Expanding Foam Sealant for Facades, p. 1, publication date unknown from document.
Emseal Joint Systems, Ltd., QuietJoint, Tech Data, Nov. 2012, pp. 1-2.
Emseal Corporation Ltd., Material Safety Data Sheet, QuietJoint, MSDS date May 13, 2014, pp. 1-2.
Emseal Joint Systems, Ltd., QuietJoint CAD Details, last modified Oct. 31, 2014, pp. 1-3.
http://www.emseal.com/products/architectural/QuietJoint/QuietJoint.htm, QuietJoint Mass-Loaded Acoustic Partition Closure, last modified Oct. 9, 2014, pp. 1-4.
http://www.emseal.com/products/architectural/QuietJoint/QuietJoint.htm, QuietJoint Mass-Loaded Acoustic Partition closure, last modified Jul. 29, 2014, pp. 1-4.
http://www.emseal.com/products/architectural/QuietJoint/QuietJoint.htm, QuietJoint Mass-Loaded Acoustic Partition closure, No intumescent coating, last modified Sep. 19, 2014, pp. 1-4.
http://williamsproducts.net/wide.html, Everlastic Wide Joint Seal, http://williamsproducts.net/wide.html[Oct. 7, 2014 3:37:39 Pm], pp. 1-3, publication date unknown from document.
Baerveldt, Konrad, The Applicator—Dear Tom: Emseal has two EIFS Expansion Joint Answers for you, Jun. 1991, pp. 1-4.
Snapshot of Office Action issued in U.S. Appl. No. 90/013,428; printed in 2015, 14 pages.
Snapshot of Notice of Allowance issued in U.S. Appl. No. 14/080,960; printed in 2015, 5 pages.
Decision Granting Ex Parte Reexamination on Control U.S. Appl. No. 90/013,473, May 19, 2015, 13 pages.
Provisional U.S. Appl. No. 60/953,703 filed Aug. 3, 2007 underlying U.S. Pat. No. 8,397,453, 24 pages.
Snapshot of Decision Granting Ex-Parte Reexamination issued in U.S. Appl. No. 90/013,472; printed in 2015; 25 pages.
Snapshot of Notice of Allowance issued in U.S. Appl. No. 14/229,463; printed in 2015; 8 pages.
Snapshot of Notice of Allowance issued in U.S. Appl. No. 13/731,327; printed in 2015, 8 pages.
Snapshot of Office Action issued in U.S. Appl. No. 14/211,694; printed in 2015, 14 pages.

(56) References Cited

OTHER PUBLICATIONS

Snapshot of Office Action issued in U.S. Appl. No. 13/652,021; printed in 2015, 13 pages.
Snapshot of Office Action issued in U.S. Appl. No. 90/013,511; printed in 2015, 24 pages.
Snapshot of Office Action issued in U.S. Appl. No. 14/278,210; printed in 2015, 11 pages.
Snapshot of Office Action for U.S. Appl. No. 14/950,930; dated Jun. 16, 2017, 6 pages.
Illbruck Construction Products, "Worldwide solutions to joint-sealing and acoustic problems", Apr. 9, 1998, 77 pages, Illbruck Construction Products, Wrexham, United Kingdom.
Snapshot of Examinees Interview Summary for U.S. Appl. No. 90/013,511; dated Aug. 26, 2016, 9 pages.
Snapshot of Office Action for U.S. Appl. No. 13/731,327; dated Jan. 4, 2017, 6 pages.
Snapshot of Notice of Allowance for U.S. Appl. No. 14/229,463; dated Jan. 5, 2017, 7 pages.
Snapshot of Notice of Allowance for U.S. Appl. No. 13/731,327; Feb. 10, 2017, 6 pages.
Snapshot of Office Action for U.S. Appl. No. 14/950,923; dated Jan. 10, 2018, 7 pages.
Snapshot of Notice of Allowability for U.S. Appl. No. 14/730,896; dated Jan. 16, 2018, 3 pages.
Underwriters Laboratories Inc., System WW-D0001, Fire Resistance Directory, vol. 2, Copyright 2000, 3 pages.
Underwriters Laboratories Inc., System FF-D-1010, 2000 Fire Resistance Directory, 2000, 1 page.
Emseal Joint Systems, Ltd., Seismic Colorseal—DS (Double-Sided), 2006, 3 pages.
Emseal Joint Systems, Ltd., BEJS System, Bridge Expansion Joint System, last modified Jul. 29, 2009, 5 pages.
Emseal Joint Systems, Ltd., AST Hi-Acrylic Metal Roof and Multi-Use Building Sealant, 2005, 2 pages.
Emseal Joint Systems, Ltd., BEJS System Install Data, Internet archive dated Sep. 22, 2010, 1 page.
Snapshot of Notice of Allowance for U.S. Appl. No. 14/511,394, dated Feb. 17, 2017, 5 pages.
Snapshot of Notice of Allowance for U.S. Appl. No. 14/455,398; dated Mar. 13, 2017, 9 pages.
Snapshot of Notice of Allowance for U.S. Appl. No. 13/729,500; dated Mar. 15, 2017, 9 pages.
Snapshot of Notice of Allowance for U.S. Appl. No. 14/278,210; dated Mar. 13, 2017, 8 pages.
Snapshot of Non-Final Office Action for U.S. Appl. No. 13/731,327; dated Mar. 18, 2016, 27 pages.
Snapshot of Final Office Action for U.S. Appl. No. 14/211,694; dated Mar. 21, 2016, 16 pages.
Snapshot of Final Office Action for U.S. Appl. No. 14/455,398; dated Mar. 29, 2016, 12 pages.
Snapshot of Ex Parte Reexamination Certificate U.S. Pat. No. 6,532,708C1 for U.S. Appl. No. 90/013,472; filed Mar. 23, 2016, 3 pages.
Specified Technologies, Inc., Firestop Products for Construction Joint Applications, Copyright 2004 indicated on last page, 20 pages.
Snapshot of Office Action issued in U.S. Appl. No. 90/013,395; printed in 2015, 27 pages.
Snapshot of Office Action issued in U.S. Appl. No. 90/013,395; printed in 2015, 48 pages.
Snapshot of Office Action issued in U.S. Appl. No. 90/013,428; printed in 2015, 23 pages.
Snapshot of Office Action issued in U.S. Appl. No. 90/013,472; printed in 2015, 22 pages.
Snapshot of Office Action issued in U.S. Appl. No. 90/013,473; printed in 2015, 22 pages.
3M; Fire Barrier CP 25WB+Caulk, Product Data Sheet, Copyright 3M 2001, 4 pages.
Tremco Incorporated, "Firestop Submittal" Data Sheet collections, Certificate of Conformance dated Nov. 2004, 47 pages; publication date unknown from document.
Emseal Joint Systems, Drawing SJS-100 In Recessed Block With Header Material, Jun. 7, 2006, 1 page.
Notification of Transmittal of International Preliminary Report on Patentability in PCT/US14/32212; dated Mar. 13, 2015; 4 pages.
Snapshot of Office Actions issued in U.S. Appl. No. 13/729,500; printed in 2015; 35 pages.
Snapshot of Office Actions issued in U.S. Appl. No. 14/278,210; printed in 2015; 27 pages.
Snapshot of Office Actions issued in U.S. Appl. No. 12/635,062; printed in 2015; 88 pages.
Snapshot of Office Actions issued in U.S. Appl. No. 13/731,327; printed in 2015; 42 pages.
Snapshot of Office Action issued in U.S. Appl. No. 14/455,398; printed in 2015; 9 pages.
Snapshot of Office Actions issued in U.S. Appl. No. 13/652,021; printed in 2015; 34 pages.
Snapshot of Office Actions issued in U.S. Appl. No. 14/080,960; printed in 2015; 10 pages.
Snapshot of Office Actions issued in U.S. Appl. No. 14/084,930; printed in 2015; 7 pages.
Snapshot of Office Action issued in U.S. Appl. No. 14/229,463; printed in 2015; 20 pages.
Snapshot of Office Action issued in U.S. Appl. No. 14/455,403; printed in 2015; 12 pages.
Snapshot of Office Action issued in U.S. Appl. No. 14/211,694; printed in 2015; 6 pages.
List of several Emseal pending patent applications and patents, and Examiners assigned thereto; Apr. 2015; 2 pages.
Snapshot of Notice of Allowance for U.S. Appl. No. 14/950,930; dated Apr. 25, 2018, 10 pages.
Snapshot of Notice of Allowance for U.S. Appl. No. 14/950,923; dated May 7, 2018, 10 pages.
Snapshot of Office Action for U.S. Appl. No. 15/494,069; dated Jul. 6, 2018, 14 pages.
Snapshot of Office Action for U.S. Appl. No. 15/494,809; dated Jul. 6, 2018, 6 pages.
DIN 4102-16, Fire Behaviour of Building Materials and Elements, Part 16, May 1998, pp. 1-12.
Decision Granting Ex Parte Reexamination on Control No. 90/013,565; filed Sep. 29, 2015, 19 pages.
Lester Hensley, "Where's the Beef in Joint Sealants? Hybrids Hold the Key," Applicator, vol. 23, No. 2, Spring 2001, pp. 1-5.
Emseal Joint Systems, Ltd, Seismic Colorseal, Tech Data, Apr. 1998, pp. 1-2.
Schul International Co., LLC, Sealtite VP Premium Quality Pre-compressed Joint Sealant for Weather tight, Vapor Permeable, Vertical Applications, Technical Data, dated Oct. 28, 2005, pp. 1-2.
ISO-CHEMIE GmbH, Product Data Sheet, ISO-FLAME Kombi F 120, pp. 1-2, UK-F010514; publication date unknown from document.
Schul International Co., LLC, Seismic Sealtite II, Colorized, Pre-compressed Joint Sealant for Vertical Applications, Technical Data, dated Sep. 20, 2006, pp. 1-2.
Dow Corning Corporation, Dow Corning 790 Silicone Building Sealant, copyright date 1995, 1999, pp. 1-5.
Emseal Joint Systems, Ltd, Horizontal Colorseal, Tech Data, Nov. 2008, pp. 1-2.
Emseal Joint Systems, Ltd, Seismic Colorseal, Tech Data, Jul. 2009, pp. 1-2.
Emseal Joint Systems, Ltd, Horizontal Colorseal, Tech Data, Jul. 2009, pp. 1-2.
Emseal Joint Systems, Ltd, Horizontal Colorseal, Tech Data, Jun. 2010, pp. 1-2.
Schul International Co., Llc, Sealtite "B", Pre-compressed Joint Sealant, Premium Quality for Secondary Sealant Applications, Technical Data, dated Oct. 28, 2005, pp. 1-2.
ISO-CHEMIE GMBH, ISO-FLAME Kombi F 120, 2006, German, pp. 1-2.
ISO-CHEMIE GmbH, Order Confirmation Sheet, dated Apr. 26, 2007, pp. 1-3.
ISO-FLAME Kombi F 120, Net Price List, Schul International Co., dated Jun. 27, 2006, pp. 1.

(56) References Cited

OTHER PUBLICATIONS

Tremco Illbruck Limited, Compriband Super FR, Fire Rated Acrylic Impregnated Foam Sealant Strip, Issue 3, dated Apr. 12, 2007, pp. 1-2.
Figure 1: The BS 476; Part 20 & EN 1363-1 time temperature curve, pp. 1; publication date unknown from document.
Schul International Co., LLC, Sealtite, Premium Quality Pre-compressed Joint Sealant For Waterproof Vertical Applications, pp. 1; publication date unknown from document.
Schul International Co., LLC, Sealtite 50N, Premium Quality Pre-compressed Joint Sealant For Horizontal Applications, dated Oct. 28, 2005, pp. 1-2.
Will-Seal, Signed, Sealed & Delivered, pp. 1; publication date unknown from document.
Illbruck/USA, Will-Seal 150 Impregnanted Precompressed Expanding Foam Sealant Tape, Spec-Data Sheet, Joint Sealers, dated Nov. 1987, pp. 1-2.
Illbruck, Inc., Will-Seal 250 Impregnanted Precompressed Expanding Foam Sealant Tape, Spec-Data Sheet, Joint Sealers, dated Aug. 1989, pp. 1-2.
U.S. Department of Labor, Material Safety Data Sheet, Identity: Willseal 150/250 and/or E.P.S., date prepared Jul. 21, 1986, pp. 1-2.
Illbruck, TechSpec Division Facade & Roofing Solutions, ALFAS compriband, Mar. 2005, pp. 1-10.
Salamander Industrial Products, Inc., blocoband HF—interior sealant, pp. 1; publication date unknown from document.
Dow Corning Corporation, Dow Corning 790 Silicone Building Sealant, copyright 2000-2005, pp. 1-2.
Grace Fireproofing Products, Monokote Z-146T. 2007, pp. 1-2.
Polyurethane Foam Field Joint Infill Systems, Sep. 23, 2007 (via Snagit), PIH, pp. 1-5.
International Search Report and Written Opinion for PCT/US2014/032212, dated Aug. 25, 2014, pp. 1-13.
Grunau Illertissen GMBH, Fir-A-Flex, Fire Protection for Linear Gaps in Walls and Ceilings, dated Aug. 1996, pp. 1-4.
UL Standard for Safety for Rests for Fire Resistance of Building Joint Systems, UL 2079, Underwriters Laboratories Inc. (UL); Fourth Edition; dated Oct. 21.2004.
Emseal "Pre-cured-Caulk-and-Backerblock" Not New, Not Equal to Emseal's Colorseal, Jul. 19, 2012.
Emseal Drawing Part No. 010-0-00-00 dated Dec. 6, 2005.
Emseal Horizontal Colorseal Tech Data, dated Jun. 1997.
Emseal Joint Systems, Drawing SJS-100-CHT-N, Nov. 20, 2007.
Emseal Technical Bulletin, Benchmarks of Performance for High-Movement Acrylic-Impregnated, Precompressed, Foam Sealants when Considering Substitutions, Jul. 3, 2012.
Emseal, Colorseal & Seismic Colorseal, May 1997, Install Data Colorseal & Seismic Colorseal, p. 1-2.
Emseal, Colorseal, Jan. 2000, Colorseal TechData, p. 1-2.
Emseal, Is there a gap in your air barrier wall design?, Jul. 19, 2012.
Manfredi, L. "Thermal Degradation and Fire Resistance of Unsaturated Polyester, Modified Acrylic Resins and their composites with Natural Fibres"; Science Direct, 2005.
Stein et al., "Chlorinated Paraffins as Effective Low Cost Flame Retardants for Polyethylene"; publication date unknown from document.
DIN 4102, Part 2, Fire Behaviour of Building Materials and Building Components, Sep. 1977.
Emseal Joint Systems, Ltd., Material Safety Data Sheet for AST-HI-ACRYLIC, pp. 1-2, date issued Apr. 2002.
ISO-Chemie, GmbH., Iso-Bloco 600, pp. 1-2, EN-B010706; publication date unknown from document.
ISO-Chemie, GmbH., Iso-Flame Kombi F 120, pp. 1-2., 2006.
Underwriters Laboratories Inc., UL Standard for Safety for Fire Tests of Building Construction and Materials, UL 263, Thirteenth Edition, Apr. 4, 2003, pp. 1-40.
Snapshot of Office Action for U.S. Appl. No. 90/013,428; dated May 6, 2016, 22 pages.
Snapshot of Office Action for U.S. Appl. No. 14/950,923; dated May 6, 2016, 13 pages.
Snapshot of Office Action for U.S. Appl. No. 14/730,896; dated May 9, 2016, 18 pages.
Snapshot of Office Action for U.S. Appl. No. 14/229,463; dated May 12, 2016, 14 pages.
Snapshot of Advisory Action for U.S. Appl. No. 90/013,511; dated May 9, 2016, 12 pages.
Snapshot of Ex Parte Reexamination Certificate U.S. Pat. No. 6,532,708C2 for U.S. Appl. No. 90/013,683; filed Jun. 7, 2016, 2 pages.
Snapshot of Office Action for U.S. Appl. No. 14/278,210; dated May 19, 2016, 12 pages.
Snapshot of Office Action for U.S. Appl. No. 14/511,394; dated May 13, 2016, 6 pages.
Snapshot of Advisory Action for U.S. Appl. No. 90/013,395; dated May 20, 2016, 4 pages.
Adolf Wurth GmbH & Co., KG, Elastic Joint Sealing Tape, labeled Copyright 2000-2003, pp. 1-7.
Expanding PU Foam, Technical Data Sheet, Feb. 1997, pp. 1-2.
ASTM International, Designation: E 84-04, Standard Test Method for Surface Burning Characteristics of Building Materials, Feb. 2004, pp. 1-19.
ASTM International, Designation: E 176-07, Standard Terminology of Fire Standards, Oct. 2007, pp. 1-20.
Auburn Manufacturing Company, Auburn Product News, Flame Retardant Silicone Sponge, 2007, p. 1.
British Board of Agrement, Agrement Certificate No. 97/3331, Second Issue, Compriband Super, 2005, pp. 1-4.
British Board of Agrement, Agrement Certificate No. 96/3309, Third Issue, Illmod 600 Sealing Tapes, 2003, pp. 1-8.
Nederland Normalistie-Instituut, Experimental Determination of the Fire Resistance of Elements of Building construction, NEN 6069, Oct. 1991, English Translation, pp. 1-30.
British Standards Institution, Fire Tests on Building Materials and Structures, BS 476: Part 20: 1987, pp. 1-44.
DIN Deutsches Institut for Normung e.V., DIN 18542, Impregnated Cellular Plastics Strips for Sealing External Joints, Requirements and Testing, Jan. 1999, pp. 1-10.
www.BuildingTalk.com, Emseal Joint Systems, Choosing a Sealant for Building Applications, Hensley. May 21, 2007, pp. 1-6.
Netherlands Organization for Applied Scientific Research (TNO), Determination of the Fire Resistance According to NEN 6069 of Joints in a Wall Sealed with Cocoband 6069 Impregnated Foam Strip, Nov. 1996, pp. 1-19.
DIN Deutsches Institut fur Normung e.V., Fire Behaviour of Building Materials and Elements, Part 1: Classification of Building Materials, Requirements and Testing, DIN 4102-1, May 1998, pp. 1-33.
DIN Deutsches Institut fur Normung e.V., Fire Behaviour of Building Materials and Elements, Overview and Design of Classified Building Materials, Elements and Components, DIN 4102-4, Mar. 1994, pp. 1-144.
DOW Corning Corporation, Dow Corning 790, Silicone Building Sealant, labeled Copyright 2000, pp. 1-6.
DOW Corning Corporation, Dow Corning 790, Silicone Building Sealant, Product Information, labeled Copyright 2000-2004, pp. 1-4.
DOW Corning Corporation, Dow Corning Firestop 400 Acrylic Sealant, 2001, pp. 1-4.
DOW Corning Corporation, Dow Corning Firestop 700 Silicone Sealant, 2001, pp. 1-6.
Emseal Joint Systems, Horizontal Colorseal, Aug. 2000, pp. 1-2.
Emseal Joint Systems, Ltd., Colorseal PC/SA Stick STD/001-0-00-00, 1995, p. 1.
Emseal Joint Systems, Ltd., 20H System, Tech Data, Jun. 1997, pp. 1-2.
Emseal Joint Systems, Ltd., Colorseal, Aug. 2000, pp. 1-2.
Emseal Joint Systems, Ltd., DSH System, Watertight Joint System for Decks, Tech Data, Nov. 2005, pp. 1-2.
Emseal Joint Systems, Ltd., Fire-Rating of Emseal 20H System, Feb. 17, 1993, p. 1-2.
Emseal Joint Systems, Ltd., Preformed Sealants and Expansion Joint Systems, May 2002, pp. 1-4.

(56) References Cited

OTHER PUBLICATIONS

Emseal Joint Systems, Ltd., Pre-Formed Sealants and Expansion Joints, Jan. 2002, pp. 1-4.
Emseal Joint Systems, Ltd., Seismic Colorseal, Aug. 2000, pp. 1-2.
Emseal Joint Systems, Ltd., Seismic Colorseal-DS (Double-Sided) Apr. 12, 2007, pp. 1-4.
Environmental Seals, Ltd., Envirograf, Fire Kills: Stop it today with fire stopping products for building gaps and openings, 2004, pp. 1-8.
Fire Retardants, Inc., Fire Barrier CP 25WB+Caulk, labeled Copyright 2002, pp. 1-4.
Illbruck Bau-Produkte GmbH u. CO. KG., willseal firestop, Product Information Joint Sealing Tape for the Fire Protection Joint, Sep. 30, 1995, pp. 1-9.
Illbruck, willseal, The Joint Sealing Tape, 1991, pp. 1-19.
Illbruck, willseal 600, Product Data Sheet, 2001, pp. 1-2.
Material Safety Data Sheet, Wilseal 150/250 and/or E.P.S., Jul. 21, 1986, pp. 1-2.
ISO 066, Technical Datasheet, blocostop F-120, 2002 p. 1.
MM Systems, ejp Expansion Joints, Expanding Impregnated Foam System, internet archive, wayback machine, Nov. 16, 2007, pp. 1-2.
MM Systems, ejp Expansion Joints, Colorjoint/SIF—Silicone Impregnated Foam System, internet archive, wayback machine, Nov. 16, 2007, pp. 1-2.
MM Systems, ColorJoint/SIF Series, Silicone Seal & Impregnated Expanding Foam, Spec Data, 2007, pp. 1-3.
Norton Performance Plastics Corporation, Norseal V740FR, Flame Retardant, UL Recognized Multi-Purpose Foam Sealant, labeled Copyright 1996, pp. 1-2.
Promat International,Ltd., Promaseal FyreStrip, Seals for Movement Joints in Floors/Walls, labeled Copyright 2006, pp. 1-4.
Promat International, Ltd., Promaseal Guide for Linear Gap Seals and Fire Stopping Systems, Jun. 2008, pp. 1-20.
Promat International, Ltd., Promaseal IBS Foam Strip, Penetration Seals on Floors/Walls, labeled Copyright 2004, pp. 1-6.
Promat International, Ltd., Safety Data Sheet, Promaseal IBS, May 25, 2007, pp. 1-3.
Schul International, Co., LLC., Color Econoseal, Technical Data, Premium Quailty Joint Sealant for Waterproof Vertical and Horizontal Applications, 2005, pp. 1-2.
Schul International, Co., LLC., Sealtite Airstop FR, Air and Sound Infiltration Barrier, labeled Copyright 1997-04, p. 1.
Schul International, Co., LLC., Sealtite Standard, Pre-compressed Joint Sealant, High Density, Polyurethane Foam, Waterproofs Vertical Applications, 2007.
Snapshot of Advisory Action for U.S. Appl. No. 90/013,395; dated Sep. 14, 2016, 16 pages.
Snapshot of Intent to Issue Ex Parte Reexamination Certificate for U.S. Appl. No. 90/013,511; filed Sep. 21, 2016, 9 pages.
Snapshot of Intent to Issue Ex Parte Reexamination Certificate for U.S. Appl. No. 90/013,395, filed Oct. 6, 2016, 9 pages.
Snapshot of Intent to Issue Ex Parte Reexamination Certificate for U.S. Appl. No. 90/013,565, filed Oct. 7, 2016, 9 pages.
Snapshot of Ex Parte Reexamination Certificate for U.S. Appl. No. 90/013,428, filed Nov. 23, 2016, 3 pages.
Snapshot of Notice of Allowance for U.S. Appl. No. 14/540,514; dated Nov. 25, 2016, 4 pages.
Snapshot of Office Action for U.S. Appl. No. 14/278,210; dated Nov. 30, 2016, 12 pages.
Snapshot of Office Action for U.S. Appl. No. 14/927,047; dated Mar. 16, 2018, 26 pages.
Snapshot of Office Action for U.S. Appl. No. 15/583,239; dated Mar. 21, 2018, 8 pages.
Snapshot of Office Action for U.S. Appl. No. 14/950,930; dated Mar. 21, 2018, 7 pages.
Snapshot of Advisory Action for U.S. Appl. No. 90/013,472—U.S. Appl. No. 90/013,473; dated Dec. 28, 2015,13 pages.
Snapshot of Non-Final Office Action for U.S. Appl. No. 90/013,428; dated Jan. 5, 2016, 14 pages.
Snapshot of Non-Final Office Action for U.S. Appl. No. 90/013,565; dated Jan. 8, 2016, 20 pages.

Dow Corning 890 Self-Leveling Silicone Joint Sealant; Dow Corning Corporation; 1996, 1999.
Emseal, BEJS System—Bridge Expansion Joint System, May 26, 2010, 5 pages.
Emseal, Emseal Acrylic Log Home Tape Installation Instructions, Jun. 2011, 1 page.
Snapshot of Notice of Allowance for U.S. Appl. No. 13/652,021; dated Jan. 8, 2016, 7 pages.
Snapshot of Non-Final Office Action for U.S. Appl. No. 14/084,930; dated Jan. 12, 2016, 11 pages.
Snapshot of Office Action in Ex Parte Reexamination for U.S. Appl. No. 90/013,395; dated Jan. 20, 2016, 26 pages.
Snapshot of Notice of Intent to Issue Ex Patent Reexamination Certificate for U.S. Appl. No. 90/013,472, filed Feb. 19, 2016, 8 pages.
Snapshot of Final Office Action for U.S. Appl. No. 90/013,511; dated Feb. 26, 2016, 45 pages.
Snapshot of Final Office Action for U.S. Appl. No. 90/013,473; dated Nov. 6, 2015, 38 pages.
ACI 504-R, Guide to Sealing Joint in Concrete Structures, ACI Committee 504, 1997, 44 pages.
Schul International Co., LLC., Sealtite VP (600) Technical Data, Premium Quality Pre-compressed Joint Sealant for Weather tight, Vapor Permeable, Vertical Applications, labeled Copyright 1997-2002, pp. 1-2.
Schul International Co., LLC., Seismic Sealtite, Technical Data, Colorized, Pre-compressed Joint Sealant for Vertical Applications, 2005, pp. 1-2.
Schul International Co., LLC., Sealtite 50N, Technical Data, Premium Quality Pre-compressed Joint Sealant for Horizontal Applications, labeled Copyright 2002, pp. 1-2.
Schul International Co., LLC., HydroStop, Expansion Joint System, 2005, pp. 1-2.
Schul International Co., LL., Sealtite, The Most Complete Line of Pre-compressed Sealants, web archive.org, wayback machine, printed 2014, pp. 1-3.
Sealant, Waterproofing & Restoration Institute, Sealants: The Professional Guide, labeled Copyright 1995, Chapter II—Sealants, p. 26, pp. 1-3.
Tremco Illbruck, Cocoband 6069, 2007, p. 1 with English translation.
Tremco Illbruck, Alfacryl FR Intumescent Acrylic, Fire Rated, Emulsion Acrylic, Intumescent Sealant, 2007, pp. 1-2.
Tremco Illbruck, Alfasil FR, Fire Rated, Low Modulus, Neutral Cure Silicone Sealant, 2007, pp. 1-2.
Tremco Illbruck, Compriband 600, Impregnated Joint Sealing Tape, 2007, pp. 1-2.
Tremco Illbruck, Compriband Super FR, Fire Rated Acrylic Impregnated Foam Sealant Strip, 2007, pp. 1-2.
Tremco Illbruck, Ltd., Technical Data Sheet, Compriband Super FR, Issue 2, Oct. 18, 2004, pp. 1-4.
Tremco Illbruck, Ltd., Technical Data Sheet, Compriband Super, Issue 1, Sep. 29, 2004, pp. 1-3.
Illbruck, TechSpec Division Facade & Roofing Solutions, Mar. 2005, pp. 1-10.
Tremco Illbruck, Alfas Bond FR, 2007, pp. 1-2.
Tremco Illbruck, Illmod 600, Jun. 2006, pp. 1-2.
Tremco Illbruck, The Specification Product Range, 2007, pp. 1-36.
Tremco Illbruck, Webbflex B1 PU Foam, Fire Rated Expanding Polyurethane Foam, Sep. 11, 2006, pp. 1-2.
UL Online Certifications Directory, System No. WW-S-0007, XHBN. WW-S-0007, Joint Systems, Dec. 5, 1997, pp. 1-3.
UL Online Certifications Directory, BXUV.GuideInfo, Fire-Resistance Ratings ANSI/UL 263, last updated Jun. 26, 2014, pp. 1-24.
Frangi et al., German language, Zum Brandverhalten von Holzdecken aus Hohlkasten-elementen, Institut fur Baustatik and Konstrucktion, Jun. 1999, pp. 1-130.
ASTM International, Designation: E 1966-01, Standard Test Method for Fire-Resistive Joint Systems, current edition approved Oct. 10, 2001. Published Jan. 2002, pp. 1-15.

(56) References Cited

OTHER PUBLICATIONS www.businesswire.com, Celanese Introduces Mowilith Nano Technology Platform for the Next General of Exterior coatings, Nurnberg, Germany, May 8, 2007, pp. 1-3.
Illbruck, Willseal firestop applied in the joints of the new Pfalz Theater in Kaiserlautern, pp. 1-2; publication date unknown document.
Dayton Superior Chemical & Cement Products, Marketing Update, Fall 2005, pp. 1-2.
Dow Corning Case Study EU Parliament, Brussels, p. 1; publication date unknown from document.
Dow Corning Silicone Sealants, Dow Coming 790 Silicone Building Sealant, Ultra-low-modulus sealant for new and remedial construction joint sealing applications, labeled Copyright 2000-2005, pp. 1-2.
Dow Corning, John D. Farrell Letter to Emseal USA, Wilford Brewer, reference: Emseal Greyflex, Oct. 4, 1984, p. 1.
Dow Corning letter to Customer, Reference: Sealant Certification for Dow Coming 790 Silicone Building Sealant, p. 1; publication date unknown from document.
Emseal Joint Systems, Ltd., Greyflex & Backerseal Wet Sealant Compatibility Chart, Test Data, Sep. 1991, p. 1.
Emseal Joint Systems, Emseal preformed expanding foam sealant, 07920/MAN, pp. 1-2; publication date unknown from document.
Colorseal by Emseal Specification Sections 07 90 00/ 07 95 00, pp. 1-4, publication date unknown from document.
Emseal Joint Systems, Ltd., Emseal Color-seal, Tech Data, pp. 1-2, publication date unknown from document.
Emseal Joint Systems, Ltd., Emseal Color-Seal, p. 1, publication date unknown from document.
www.emseal.com/products, Horizontal Colorseal by Emseal Expansion Joints and Pre-Compressed Sealants, last modified Sep. 19, 2014.
Horizontal Colorseal by Emseal, Specification Sections 07 90 00/ 07 95 00, pp. 1-4; publication date unknown document.
Emseal Material Safety Data Sheet, Acrylic Loghome Tape, pp. 1-2, issued Apr. 2002.
Seismic Colorseal by Emseal Specification Sections 07 90 00/ 07 95 00, pp. 1-4; publication date unknown from document.
Emseal Joint Systems, Ltd., Summary Guide Specification, p. 1; publication date unknown from document.
Emseal Joint Systems, The complete package for all joint requirements, 1988, pp. 1-6.
Envirograf, Cavity Barriers Fire Seal Range, Technical Data, pp. 1-32; publication date from unknown from document.
web.archive.org, www.envirograf.com, Product 40: Intumescent-Coated Fireproof Sponge (patented), labeled Copyright 2007, pp. 1-2.
web.archive.org, www.envirograf.com, Product 5: Intumescent-Caoted Non-Fibrous Slabs (patented), labeled Copyright Apr. 10, 2007, p. 1.
Afk Yapi Elemanlari, Hannoband-BSB Bg1, Fire prevention tape Flame resistand pursuant to DIN 4102 T1, Technical Data Sheet, pp. 1-4; publication date unknown document.
Hanno Dicht-und Dammsysteme, Hannoband-BG1, High Performance am Bau, German language, 2000, pp. 1-6.
Illbruck, willseal firestop fur die Brandschutz-Fuge, Information,German language, pp. 1-2; publication date unknown from document.
Illbruck Sealant Systems, Cocoband 6069, Productinfomatie, Dutch language, 2003, pp. 1-2.
Illbruck Sealant Systems, Inc., Sealant Products and Systems, 2002, pp. 1-12.
Illbruck, Will-Seal, 3.0 Construction Requirements, pp. 1-8; publication date unknown from document.
Sealtite Joint Sealants, What is the material used in the U-Channel? pp. 1- 4; publication date unknown from document.
Snapshot of Advisory Action for U.S. Appl. No. 90/013,565; dated Jul. 19, 2016, 5 pages.

Mercury et al., "On the Decomposition of Synthetic Gibbsite Studied by Neutron Thermodiffractometry", J. Am. Ceram, Soc. 89, (2006), pp. 3728-3733.
Brydon et al., "The Nature of Aluminum Hydroxide-Montmorillonite Complexes", The American Minerologist, vol. 51, May-Jun. 1966, pp. 875-889.
Huber, Alumina Trihydrate (ATH), A Versatile Pigment for Coatings, Inks, Adhesives, Caulks and Sealants Applications, Dec. 2005, 5 pgs.
3.3.3.8 Thermal Stability/Loss on Ignition/Endotheric Heat, Figure 3.9, 1 pg.
Report on the Filing or Determination of an Action Regarding a Patent or Trademark, Filed Aug. 13, 2014 regarding U.S. Pat. No. 8,739,495, p. 1.
Plastics Flammability Handbook, pp. 52, 59, and 60, 3 pages; publication date unknown from document.
Defendants' Answer, Counterclaims, Affirmative Defenses, and Jury Demand, 1:14-cv-00359-PB, Doc. 11, filed Oct. 3, 2014, 20 pages.
Defendants' Objection to Plaintiffs Partial Motion to Dismiss, 1:14-cv-00358-SM, Doc. 24, filed Nov. 10, 2014, pp. 1-3.
Defendants' Objection to Plaintiffs Motion to Strike Defendants' Tenth Affirmative Defense, 1:14-cv-00358-SM, Doc. 25, filed Nov. 12, 2014, pp. 1-3.
Defendants' Answer, Counterclaims, and Affirmative Defenses to Plaintiffs Consolidated Complaint, 1:14-cv-00358-SM, Doc. 38, filed Dec. 9, 2014, pp. 1-48.
Defendants' Objection to Plaintiffs Partial Motion to Dismiss Count III of Defendants' Counterclaim, 1:14-cv-00358-SM, Doc. 50, filed Jan. 16, 2015, pp. 1-15.
Defendants' Surreply to Plaintiffs Partial Motion to Dismiss Count II of Defendants' Counterclaims., 1:14-cv-00358-SM, Doc. 55, filed Feb. 13, 2015, pp. 1-6.
Joint Claim Construction and Prehearing Statement, 1:14-cv-00358-SM, Doc. 56, filed Mar. 3, 2015, pp. 1-9.
Lester Hensley, "Where's the Beef in Joint Sealants? Hybrids Hold the Key," AWCI's Construction Dimensions, Jan. 2006, 3 pgs.
IsoChemie, Iso-Bloco 600, Correspondence of Jun. 8, 2006, 13 pages.
Shul International Company, Invoice #18925 to P. J. Spillane, Sep. 14, 2007, 5 pages.
Illbruck Inc., Tested Physical Properties, 1994, 1 page.
Andrea Frangi, Zum Brandverhalten von Holzdecken aus Hohlkastenelementen; Jun. 1999; 125 pages (English Translation).
Defendants' Joint First Amended Preliminary Invalidity Contentions received at MKG Mar. 17, 2015, 25 pgs. total.
Defendants' Joint First Amended Preliminary Invalidity Contentions received at MKG Mar. 17, 2015, Appendix A, 6 pgs.
Defendants' Joint First Amended Preliminary Invalidity Contentions received at MKG Mar. 17, 2015, Appendix B, 270 pgs.
Defendants' Joint First Amended Preliminary Invalidity Contentions received at MKG Mar. 17, 2015, Appendix B, 376 pgs.
Defendants' Joint First Amended Preliminary Invalidity Contentions received at MKG Mar. 17, 2015, Appendix C, 125 pgs.
Defendants' Joint First Amended Preliminary Invalidity Contentions received at MKG Mar. 17, 2015, Appendix D, 4 pgs.
IBMB, Test Report No. 3263/5362, Jul. 18, 2002, English Translation, 14 pgs.
IBMB, Test Report No. 3263/5362, Jul. 18, 2002, German, 13 pgs.
IBMB, Test Report No. 3002/2719, Mar. 22, 2000, English Translation, 14 pgs.
IBMB, Test Report No. P-3568/2560-MPA BS, Sep. 30, 2000, English Translation, 22 pgs.
IBMB, Test Report No. P-3568/2560-MPA BS, Sep. 30, 2000, German, 14 pgs.
IFT Rosenheim, Evidence of Performance Test Report 105 324691/e U, Apr. 19, 2006, 8 pgs.
Snapshot of Final Office Action for U.S. Appl. No. 14/540,514; dated Mar. 31, 2016, 18 pages.
Emseal Corporation, Seismic Colorseal by Emseal, "Last Modified": Aug. 21, 2007, 4 pages.
Emseal Joint Systems, Ltd., Backerseal (Greyflex), Sep. 2001, 2 pages.

(56) References Cited

OTHER PUBLICATIONS

Emseal Joint Systems, Ltd., Install Data—Horizontal Colorseal—With Expoxy Adhesive, Jun. 2006, 2 pages.
Emseal Joint Systems, Lt., Preformed Sealants and Expansion Joint Systems, May 2002, pp. 1-4.
Emseal Joint System, Ltd., Tech Data DSH System, Jan. 2000, pp. 1-2.
Emseal Joint Systems, Ltd., Emseal CAD.dwg, Oct. 2000, pp. 1-7.
Emseal Joint Systems, Ltd., Installation Instructions: AST & IST Sealant Tapes, Dec. 1998, p. 1.
Emseal Joint Systems, Ltd., Emshield WFR2, Fire-Rated Expansion Joint Product Data, Jun. 2009, pp. 1-2.
Emseal Joint System, Ltd., ½Inch Colorseal, Binary Seal System Components, document dated Nov. 24, 1992, p. 1.
Defendants' Joint Second Amended Preliminary Invalidity Contentions received at MKG Jun. 30, 2015, Appendix A, 7 pgs.
Defendants' Joint Second Amended Preliminary Invalidity Contentions received at MKG Jun. 30, 2015, Appendix B-1, 346 pgs.
Defendants' Joint Second Amended Preliminary Invalidity Contentions received at MKG Jun. 30, 2015, Appendix B-2, 314 pgs.
Defendants' Joint Second Amended Preliminary Invalidity Contentions received at MKG Jun. 30, 2015, Appendix C, 159 pgs.
Defendants' Joint Second Amended Preliminary Invalidity Contentions received at MKG Jun. 30, 2015, Appendix D, 5 pgs.
Defendants' Joint Second Amended Preliminary Invalidity Contentions received at MKG Jun. 30, 27 pgs. total.
Snapshot of Office Action for U.S. Appl. No. 90/013,395; dated Apr. 7, 2016, 37 pages.
Snapshot of Office Action for U.S. Appl. No. 90/013,565; dated Apr. 8, 2016, 48 pages.
Emseal Joint Systems, Ltd., BEJS System Tech Data, Mar. 2009, 2 pages.
Emseal's new Universal-90 expansion joints, Buildingtalk, Pro-Talk Ltd., Mar. 27, 2009, 2 pages.
Emseal Joint Systems, Ltd., Emseal Emshield DFR2 System DFR3 System Tech Data, May 2010, 4 pages.
Emseal Seismic Colorseal, Aug. 21, 2007, 4 pages.
Emseal Joint Systems, Ltd., Emseal New Universal 90's Watertight, Factory Fabricated Upturn/Downturn Transition Pieces for Ensuring Continuity of Seal, Aug. 4, 2009, 4 pages.
DIN 4102-1, Fire Behaviour of Building Materials and Elements, Part 1, May 1998, pp. 1-33.
DIN 4102-2, Fire Behaviour of Building Materials and Building Components, Part 2, Sep. 1977, pp. 1-11.
DIN 4102-15, Fire Behaviour of Building Materials and Elements, Part 15, May 1990, pp. 1- 15.
DIN 18542, Impregnated Cellular Plastics Strips for Sealing External Joints, Jan. 1999, pp. 1-10.
ASTM International, Standard Test Method for Surface Burning Characteristics of Building Materials, Designation: E-84-04, Feb. 2004, pp. 1-19.
Illbruck Bau-Technik GmbH, Illbruck Illmod 600, Jan. 2002, pp. 1-2.
Illbruck Sealant Systems, Inc., Illbruck Willseal 600, 2001, pp. 1-2.
Iso-Chemie GmbH., Iso-Bloco 600, pp. 1-2, publication date unknown from document.
Iso-Chemie GmbH., Iso-Flame Kombi F 120, pp. 1-2, copyright 2001.
Schul International, Co., LLC., Seismic Sealtite II, Colorized, Pre-compressed Joint Sealant for Vertical Applications, Technical Data, 2006, pp. 1-2.
Underwriters Laboratories, Inc., Standard for Safety, Tests for Fire Resistance of Building Joint Systems, UL-2079, Fourth Edition, Dated Oct. 21, 2004, Revisions through and including Jun. 30, 2008, pp. 1-38.
MM Systems Corp., MM DSS Expansion Joint, Dual Seal Self-Expanding Seismic System, Feb. 18, 2008, pp. 1-2.
Order Granting Request for Ex Parte Reexamination for U.S. Pat. No. 8,739,495, Dec. 12, 2014, Control No. 90/013,395, pp. 1-19.

Emseal Joint Systems, Ltd., Fire-Rating of Emseal 20H System, Feb. 17, 1993, p. 1.
C:\WP\SLSMTG\20HDBJ.TBL Apr. 18, 1993, 20H—Description, Benefits, Justification, p. 1.
Order Granting Request for Ex Parte Reexamination for U.S. Pat. No. 8,813,449, Feb. 11, 2015, Control No. 90/013,428, pp. 1-19.
Snapshot of Advisory Action for U.S. Appl. No. 90/013,428; Sep. 8, 2016, 13 pages.
Snapshot of Notice of Allowance for U.S. Appl. No. 12/635,062; dated Oct. 9, 2015, 5 pages.
Snapshot of Office Action for U.S. Appl. No. 90/013,511; dated Oct. 23, 2015, 28 pages.
Snapshot of Intent to Issue Ex Parte Reexamination Certificate for U.S. Appl. No. 90/013,428, filed Oct. 31, 2016, 7 pages.
Snapshot of Ex Parte Reexamination Certificate for U.S. Appl. No. 90/013,511, filed Oct. 31, 2016, 3 pages.
Snapshot of Ex Parte Reexamination Certificate for U.S. Appl. No. 90/013,565, filed Nov. 2, 2016, 3 pages.
Schul International Co., LLC., Firejoint 2FR-H, Fire Rated Expansion Joint 2 Hour Fire Rated, labeled Copyright 2012, pp. 1-2.
Willseal LLC, Product Data Sheet, Willseal FR-H, Horizontal 2 and 3 hour fire rated seal, labeled Copyright 2013, pp. 1-2.
Schul International Co., LLC., Firejoint 2FR-V, Fire Rated Expansion Joint—2 Hour Fire Rated, labeled Copyright 2012, pp. 1-2.
Willseal LLC, Product Data Sheet, Willseal FR-V, Vertical 2 and 3 hour fire rated seal, labeled Copyright 2013, pp. 1-2.
UL Online Certifications Directory, System No. FF-D-0082, XHBN.FF-D-0082 Joint Systems, Jul. 29, 2013, pp. 1-2.
UL Online Certifications Directory, System No. FF-D-1100, XHBN.FF-D-1100 Joint Systems, Sep. 24, 2012, pp. 1-2.
UL Online Certifications Directory, System No. WW-D-2013, XHBN.WW-D-2013 Joint Systems, May 27, 2004, pp. 1-2.
UL Online Certifications Directory, System No. FF-D-2008, XHBN.FF-D-2008 Joint Systems, Mar. 31, 2003, pp. 1-2.
UL Online Certifications Directory, System No. FF-D-1053, XHBN.FF-D-1053 Joint Systems, Nov. 28, 2007, pp. 1-2.
UL Online Certifications Directory, System No. WW-D-3005, XHBN.WW-D-3005 Joint Systems, Nov. 15, 1999, pp. 1-2.
UL Online Certifications Directory, XHHW.R8196 Fill, Void or Cavity Materials, labeled Copyright 2014, pp. 1.
UL Online Certifications Directory, XHBN.FF-D-0075 Joint Systems, Apr. 30, 2010, pp. 1-2.
UL Online Certifications Directory, System No. FF-D-0075, XHBN.FF-D-0075 Joint Systems, Aug. 21, 2014, pp. 1-2.
UL Online Certifications Directory, XHBN.FF-D-0094 Joint Systems, Sep. 11, 2013, pp. 1-2.
UL Online Certifications Directory, XHBN.FF-D-1121 Joint Systems, Apr. 25, 2013, pp. 1-2.
UL Online Certifications Directory, System No. FF-D-2006, XHBN.FF-D-2006 Joint Systems, Jun. 28, 2002, pp. 1-3.
Underwriters Laboratories (UK) Ltd., Assessment Report, Project No. 12CA37234, Aug. 24, 2012, pp. 1-20.
Emseal Joint Systems, Ltd., 2 inch Quietjoint—concrete to concrete, Part No. SHH_2_WW_CONC, Mar. 25, 2014, p. 1.
Emseal Joint Systems, Ltd., 2 inch Quietjoint—gypsum to gypsum, Part No. SHH_2_WW_GYP, Mar. 25, 2014, p. 1.
Emseal Joint Systems, Ltd., 2 inch Quietjoint at concrete wall to window, Part No. SHG_2_WW_CONC_TO_GLASS_INSIDE_CORNER, Mar. 25, 2014, p. 1.
Emseal Joint Systems, Ltd., 2 inch Quietjoint at Gypsum Wall to Window, Part No. SHG_2_WW_GL_INSIDE_CORNER_GYP, Mar. 25, 2014, p. 1.
Emseal Joint Systems, Ltd., 2 inch Quietjoint—Concrete to Concrete at Head of Wall, Part No. SHH_2_HW_CONC_INSIDE_CORNER, Mar. 25, 2014, p. 1.
Emseal Joint Systems, Ltd., 2 inch Quietjoint—Gypsum to Concrete at Head of Wall, Part No. SHH_HW_GYP_CONC_INSIDE_CORNER, Mar. 25, 2014, p. 1.
Emseal Joint Systems, Ltd., 2 inch Quietjoint at Wall Partition to Window, Part No. SHG_2_WW_GL_INSIDE_CORNER_WALL_PARTITION_WINDOW, Mar. 25, 2014, p. 1.
Emseal Joint Systems, Ltd., Emshield DFR3 MSDS, last modified Sep. 3, 2014, p. 1.

(56) References Cited

OTHER PUBLICATIONS https://www.google.com/search, seismic colorseal 5130176 "5,130,176", printed on Oct. 12, 2014, p. 1.
http://www.amazon.com, search for emseal 8,739,495, 1-16 of 624 results for emseal 8,739,495, printed on Oct. 13, 2014, pp. 1-5.
http://www.amazon.com/QuietJoint-Acoustic-Partition-Closure-2-sided, QuietJoint Acoustic Partition Closure for 3 inch (75mm) Joint, 10 foot (3m), printed on Sep. 29, 2014, pp. 1-3.
http://www.amazon.com/QuietJoint-Acoustic-Partition-Closure-3-sided, QuietJoint Acoustic Partition Closure for ⅝inch (15 mm) Joint, 10 foot (3m), printed on Oct. 13, 2014, pp. 1-3.
Illbruck, Illmod 2d, Product Information, 2002, pp. 1-2.
Emseal Joint Systems, Ltd., Laminations as a Build Choice—The Anatomy of Quality in Pre-Compressed Foam Sealants, last modified Jul. 30, 2013, pp. 1-3.
2000 Fire Resistance Directory, p. 1012; publication date unknown from document.
Firestop Submittal Package, Fire Resistive Joint Systems—Waterproofing, SpecSeal Firestop Products, Specified Technologies, Inc, Somerville NJ; p. 1-37, publication date unknown from document.
Specified Technologies Inc., Product Data Sheet, Series ES, Elastomeric Sealant, Copyright 2000, p. 1-4.
Specified Technologies Inc., Product Data Sheet, PEN200 Silicone Foam, Copyright 2003, p. 1-2.
ISO-Chemie GmbH, Schul International Co., Order Confirmation, Doc. No. 135652, Customer No. 38012, Date, Apr. 26, 2007, p. 1-3.
Watson Bowman Acme, Wabo Seismic Parking Deck Exp. Joints, Sales Drawing, Feb. 6, 1988, 3 pgs.
Emseal Corp., Horizontal Colorseal Data Sheet, Jun. 1997, 3 pgs.
Emseal Corp., Horizontal Colorseal Beneath Coverplate Product Design Drawing, Oct. 2000, 1 pg.
Emseal Corp., 20H System Data Sheet, Sep. 1996, pp. 1-2.
Watson Bowman ACME, Product Catalog, Feb. 1993, pp. 1-8.
Emseal Joint Systems, Watertight by Design, Buyline 0339, Copyrighted 1996 and marked Jan. 1999, 8 pgs.
Dow Corning, Down Corning 790 Silicone Building Sealant Data Sheet, Copyrighted 1995, 1999, 8 pgs.
Emseal Joint Systems, Sealing Joints in the Building Envelope: Principles, Products & Practices, Copyright date of 1999, 39 pgs.
Emseal Joint Systems, Product Catalog, Copyright date of 1987, 16 pgs.
Emseal Joint Systems, 20H-Compression Seal Comparison, Apr. 12, 1994, 1 pg.
Emseal Joint Systems, Ltd., Emseal Joint Systems, Marketing Brochure, Jan. 1997, 8 pgs.
City of San Diego, CWP Guidelines, Feb. 1992, pp. 1-13.
Salamander Industrial Products, Inc., blocoband HF—interior sealant, publication date unknown from document, 4 pages.
Snapshot of Office Action for U.S. Appl. No. 15/386,907; dated Nov. 1, 2018, 8 pages.
Snapshot of Office Action for U.S. Appl. No. 15/589,329; dated Nov. 1, 2018, 13 pages.
Snapshot of Office Action for U.S. Appl. No. 15/633,176; dated Nov. 1, 2018, 15 pages.
Snapshot of Office Action for U.S. Appl. No. 15/589,329; dated Apr. 4, 2019, 11 pages.
Snapshot of Office Action for U.S. Appl. No. 15/633,176; dated Apr. 8, 2019, 15 pages.
Snapshot of Office Action for U.S. Appl. No. 15/681,622; dated Dec. 11, 2018, 14 pages.
Snapshot of Office Action for U.S. Appl. No. 15/494,809; dated Dec. 11, 2018, 11 pages.
Snapshot of Office Action for U.S. Appl. No. 15/613,936; dated Jan. 24, 2019, 7 pages.
Snapshot of Office Action for U.S. Appl. No. 16/115,861; dated Jan. 24, 2019, 5 pages.
Notice of Allowance for U.S. Appl. No. 14/927,047; dated Feb. 6, 2019, 8 pages.
Snapshot of Office Action for U.S. Appl. No. 15/613,936; dated Jun. 26, 2019, 28 pages.
Snapshot of Office Action for U.S. Appl. No. 16/243,250; dated Jun. 27, 2019, 25 pages.
Snapshot of Office Action for U.S. Appl. No. 15/681,622; dated Jul. 5, 2019, 14 pages.
Snapshot of Office Action for U.S. Appl. No. 15/589,329; dated Jul. 25, 2019, 9 pages.
Snapshot of Office Action for U.S. Appl. No. 15/633,176; dated Jul. 29, 2019, 12 pages.
Snapshot of Office Action for U.S. Appl. No. 16/115,858; dated Jul. 30, 2019, 7 pages.
Office of Aviation Research, "Polymer Flammability", DOT/FAA/AR-05/14, May 2005, 82 pages, Washington, D.C. 20591.
Snapshot of Office Action for U.S. Appl. No. 16/115,858; dated Mar. 15, 2019, 7 pages.
Snapshot of Notice of Allowance for U.S. Appl. No. 16/115,861; dated May 15, 2019, 5 pages.
Snapshot of Office Action for U.S. Appl. No. 15/386,907; dated May 13, 2019, 8 pages.
Snapshot of Office Action for U.S. Appl. No. 15/589,329; dated Nov. 20, 2019, 10 pages.
Snapshot of Office Action for U.S. Appl. No. 15/613,936; dated Nov. 21, 2019, 23 pages.
Snapshot of Office Action for U.S. Appl. No. 15/633,176; dated Nov. 21, 2019, 13 pages.
Snapshot of Office Action for U.S. Appl. No. 16/243,250; dated Jan. 2, 2020, 22 pages.
Snapshot of Office Action for U.S. Appl. No. 15/681,622; dated Jan. 13, 2020, 16 pages.
Snapshot of Office Action for U.S. Appl. No. 15/613,936; dated Jan. 29, 2020, 4 pages.
Snapshot of Office Action for U.S. Appl. No. 15/589,329; dated Jan. 29, 2020, 3 pages.
Snapshot of Office Action for U.S. Appl. No. 15/633,176; dated Jan. 29, 2020, 4 pages.
UL 2079 Tests for Fire Resistance of Building Joint Systems, 38 pages, Jun. 30, 2008, Underwriters Laboratories Inc., Northbrook, Illinois.†

\* cited by examiner
† cited by third party

FIRE AND/OR WATER RESISTANT EXPANSION AND SEISMIC JOINT SYSTEM

CROSS REFERENCE TO RELATED APPLICATIONS

This application is a Continuation Application of U.S. patent application Ser. No. 14/455,403, filed on Aug. 8, 2014, now U.S. Pat. No. 9,689,158, which is a Continuation Application of U.S. patent application Ser. No. 13/729,980, filed on Dec. 28, 2012, now U.S. Pat. No. 8,813,450, issued on Aug. 26, 2014, which is a Continuation-in-Part application of and claims priority to U.S. patent application Ser. No. 12/730,354, filed on Mar. 24, 2010, now U.S. Pat. No. 8,341,908, issued on Jan. 1, 2013, which claims the benefit of U.S. Provisional patent application Ser. No. 61/162,820, filed on Mar. 24, 2009, the contents of each of which are incorporated herein.

TECHNICAL FIELD

The present invention relates generally to joint systems and, more particularly, to an expansion and seismic joint system that is fire and water resistant for use in building and construction applications.

BACKGROUND

Building and construction applications in which materials such as concrete, metal, and glass are used typically employ joint systems that accommodate thermal expansion and/or seismic movement of the various materials thereof. These joint systems may be positioned to extend through both the interior and exterior surfaces (e.g., walls, floors, and roofs) of a building or other structure. In the case of an exterior joint in an exterior wall, roof, or floor exposed to external environmental conditions, the joint system may also, to some degree, resist the effects of such conditions. As such, most exterior joints are designed to resist the effects of water. In particular, vertically-oriented exterior joints are designed to resist water in the form of rain, snow, ice, or debris that is driven by wind. Horizontally-oriented joints are designed to resist water in the form of rain, standing water, snow, ice, debris such as sand, and in some circumstances several of these at the same time. Additionally, some horizontal systems may be subjected to pedestrian and/or vehicular traffic and are designed to withstand such traffic.

In the case of interior joints, water tightness aspects are less of an issue than they are in exterior joints, and so products are often designed simply to accommodate building movement. However, interior horizontal joints may also be subject to pedestrian traffic and in some cases vehicular traffic as well. Particularly with regard to joints in horizontal surfaces, cover plates can be fitted over the joints to allow for the smooth movement of traffic over the joint and/or to protect the material of the joint from the effects of the weather.

It has been generally recognized that building joint systems are deficient with respect to fire resistance. In some instances, movement as a result of building joint systems has been shown to create chimney effects which can have consequences with regard to fire containment. This often results in the subversion of fire resistive elements that may be incorporated into the construction of a building. This problem is particularly severe in large high-rise buildings, parking garages, and stadiums where fire may spread too rapidly to allow the structures to be evacuated.

Early designs for fire resistive joints included blocks of mineral wool or other inorganic materials of either monolithic or composite constructions. Field-applied liquid sealants were often used in these joints. In general, these designs were adequate for non-moving joints or control joints where movements were very small. Where movements were larger and the materials were significantly compressed during the normal thermal expansion cycles of the building structure, these designs generally did not function as intended. Indeed, many designs simply lacked the resilience or recovery characteristics for maintaining adequate coverage of the entire joint width throughout the normal thermal cycle (expansion and contraction) that buildings experience. Many of these designs were tested in accordance with accepted standards such as ASTM E-119, which provides for fire exposure testing of building components under static conditions and does not take into account the dynamic nature of expansion joint systems. As described above, this dynamic behavior can contribute to the compromise of the fire resistance properties of some building designs.

Underwriters Laboratories developed UL 2079, a further refinement of ASTM E-119, by adding a cycling regimen to the test. Additionally, UL 2079 stipulates that the design be tested at the maximum joint size. This test is more reflective of real world conditions, and as such, architects and engineers have begun requesting expansion joint products that meet it. Many designs which pass ASTM E-119 without the cycling regime do not pass UL 2079. This may be adequate, as stated above, for non-moving building joints; however, most building expansion joint systems are designed to accommodate some movement as a result of thermal effects (e.g., expansion into the joint and contraction away from the joint) or as a result of seismic movement.

Both expansion joints and fire resistive expansion joints typically address either the water tightness (waterproof or water resistance) aspects of the expansion joint system or the fire resistive nature of the expansion joint system, as described above, but not both.

Water tight expansion joints exist in many forms, but in general they are constructed from materials designed to resist water penetration during the mechanical cycling caused by movement of the building due to thermal effects. These designs generally do not have fire resistant properties in a sufficient fashion to meet even the lowest fire rating standards. Indeed, many waterproofing materials act as fuel for any fire present, which can lead to a chimney effect that rapidly spreads fire throughout a building.

Conversely, many fire rated expansion joints are not sufficiently water tight to render them suitable for exterior applications. Many designs reliant upon mineral wool, ceramic materials and blankets, and intumescents, alone or in combination with each other, have compromised fire resistance by coming into contact with water. Additionally, as noted above, many fire rated designs cannot accommodate the mechanical cycling due to thermal effects without compromising the fire resistance.

This has resulted in the installation of two systems for each expansion joint where both a fire rating and water resistance is desired. In many cases, there simply is not sufficient room in the physical space occupied by the expansion joint to accommodate both a fire rated system and a system capable of providing waterproofing or water resistance. In instances where the physical accommodation can be made, the resultant installation involves two products, with each product involving its own crew of trained installers. Care is exercised such that one installation does not compromise the other.

Many systems also employ on-site assembly to create a finished expansion joint system. This is arguably another weakness, as an incorrectly installed or constructed system may compromise fire and water resistance properties. In some cases, these fire resistant expansion joint systems do not employ cover plates and are instead invasively anchored to the concrete substrate. Over time, the points at which such systems are anchored are subject to cracking and ultimately spalling, which may subvert the effectiveness of the fire resistance by simply allowing the fire to go around the fire resistant elements of the system. Without cover plates over the joints, fire in these cases would not be contained within the joints.

Also, many expansion joint products do not fully consider the irregular nature of building expansion joints. It is quite common for an expansion joint to have several transition areas along its length. These may be walls, parapets, columns or other obstructions. As such, the expansion joint product, in some fashion or other, follows the joint. In many products, this is a point of weakness, as the homogeneous nature of the product is interrupted. Methods of handling these transitions include stitching, gluing, and welding. All of these are weak spots from both a water proofing aspect and a fire resistance aspect.

SUMMARY OF THE INVENTION

As used herein, the term "waterproof" means that the flow of water is prevented, the term "water resistant" means that the flow of water is inhibited, and the term "fire resistant" means that the spread of fire is inhibited.

In one aspect, the present invention resides in a fire and water resistant expansion and seismic joint system having a cover plate; a spline attached to the cover plate along a first edge of the spline; and a core comprising a first core portion and a second core portion, each portion being located on an opposing face of the spline. The first core portion and the second core portion have a fire-retardant material infused therein. The spline depends from the cover plate in a one piece construction and extends into the core to a depth within the core, and is positioned in a gap between substantially coplanar substrates such that the cover plate covers the gap. Each portion of the core is compressed between a respective face of the spline and a face of one of the coplanar substrates.

In another aspect, the present invention resides in a fire and water resistant expansion and seismic joint system having a cover plate; a spline attached to the cover plate along a first edge of the spline; and a core comprising a first core portion and a second core portion, each portion being located on an opposing face of the spline. The first core portion and the second core portion have a fire-retardant material infused therein. The spline depends from the cover plate in a one piece construction and extends into the core to a depth within the core. The first core portion is compressed between the first face of the spline and one of the coplanar substrates and the second core portion is compressed between the second face of the spline and the other of the coplanar substrates. A layer comprising the fire retardant material is sandwiched between the material of the core, and the core is not coated with any fire retardant material on any outer surface of the core.

In the expansion and seismic joint systems described herein, the elastomer material (if present) is cured and provides for water tightness (waterproofing and/or water resistance), the intumescent material (if present) is cured to provide for fire resistance, and the fire retardant infused core provides for both fire resistance and movement properties. These materials can, e.g., be assembled and arranged so as to offer water tightness in one direction and fire resistance in the other (an asymmetrical configuration), or in a fashion that offers both water tightness and fire resistance in both directions (a symmetrical configuration) through a building joint. The system is delivered to the job site in a pre-compressed state ready for installation into the joint.

DETAILED DESCRIPTION OF THE INVENTION

The expansion joint systems described herein can be understood by referring to the attached drawings and also to U.S. Pat. No. 6,532,708, which is incorporated by reference herein. One embodiment of an expansion joint system as described herein is installed between concrete substrates to define a concrete expansion joint system capable of accommodating movement of the concrete substrates due to thermal effects and/or seismic effects. The present invention is not limited in this regard, however, as the expansion joint system may be installed between substrates or surfaces other than concrete. Materials for such substrates or surfaces include, but are not limited to, glass, asphalt, stone (granite, marble, etc.), and the like. Furthermore, the expansion joint systems described herein are generally referred to as being horizontally oriented; however, the present invention is not limited in this regard, as the joint systems (with or without cover plates) can also be installed vertically.

Figure 1:
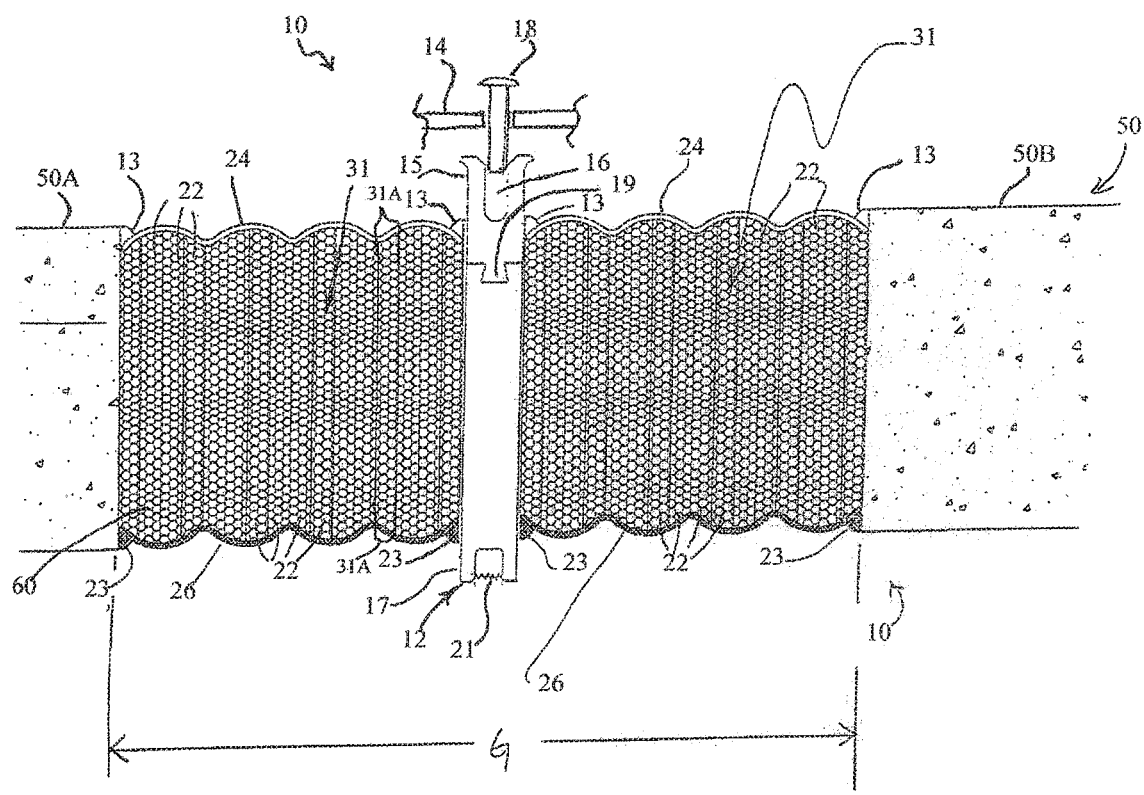
FIG. 1 is a schematic view of one embodiment of an expansion joint system of the present invention illustrating a multiple piece vertical element or spline.

Referring to FIG. 1, one embodiment of an expansion joint system is shown at 10 and is hereinafter referred to as "system 10." In system 10, a vertical element or spline 12 is located between horizontally-oriented concrete substrates 50, two substrates 50A and 50B being shown. The spline 12 can be positioned between concrete substrates 50 via the use of a cover plate 14 that is located over and spans a gap G between the concrete substrates 50 such that the spline extends substantially vertically into the gap G. Fasteners 18 are used secure the cover plate 14 to the spline 12.

The spline 12 can comprise one or more pieces. In a one-piece or "monolithic" configuration, the spline 12 comprises a suitable material such as graphite or a plastic (e.g., polycarbonate, acrylic, polyvinyl chloride, or the like) or any other material. While in some instances it is preferable that the spline material is non-electrically conductive, the present invention is not limited in this regard, as a monolithic spline 12 could be, e.g., metal or an alloy of two or more metals.

In a two-piece or multi-piece configuration, the spline 12 may comprise different materials that are suitable for the application at hand, and the materials may be metal and/or non-metal. For example, in an application where increased rigidity is desired, the spline 12 may be comprised of a first piece fabricated or formed from a metal and joined edge-to-edge with a second piece fabricated or formed from the non-conductive material. Metals that may be used for the spline 12 include, but are not limited to, aluminum, steel (e.g., stainless steel), and the like.

In one embodiment of a two-piece spline 12, shown in FIG. 1, an upper portion 15 includes holes 16, channels, or similar structure to receive the fasteners 18. The upper portion 15 is an aluminum bar or rail having holes 16 located in an upper end in which the fasteners 18 are received. A lower end of the upper portion 15 includes a protrusion 19 that enables the upper portion to connect to a corresponding slot or the like in a lower portion 17 of the spline 12 in a dovetail-type fitting. The present invention is not limited in this regard, as the upper portion 15 can be connected to the lower portion 17 using any suitable means. The lower portion 17 is preferably fabricated of the non-conductive plastic or similar material. A channel is located in a bottom end of the lower portion, and an intumescent material 21 is located therein. The spline 12 is not limited to the use of metal upper portions 15 and non-conductive lower portions 17, as other materials are within the scope of the present invention.

Figure 1A:
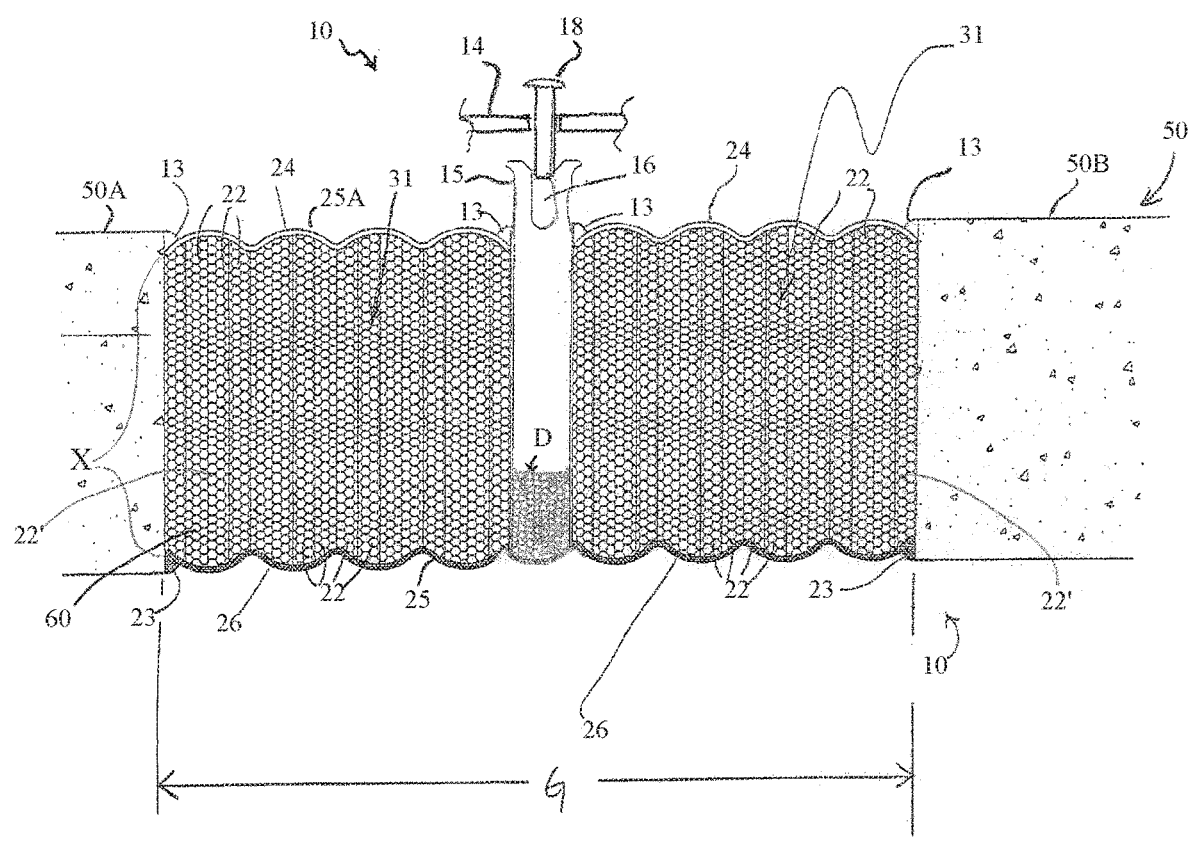
FIG. 1A is a schematic view of another embodiment of an expansion joint system illustrating a one piece vertical element or spline.

FIG. 1A illustrates a non-limiting embodiment of a one piece construction of the vertical element or spline 12 where the upper portion 15 of the spline 12 extends to a depth D, as measured from substantially a top surface of the core 22' including any coating(s) thereon and extending vertically downward. It is noted that FIG. 1A illustrates one non-limiting depth to which the spline 12 may extend and other depths are possible, according to embodiments. For instance, vertical element or spline 12 of FIG. 1A could extend all the way down to the lower edge 25 of core 22' including any coating(s) thereon. Non-limiting examples of suitable depths to which the spline 12 could extend, as measured from substantially the top surface 25A of the core 22' including any coating(s) thereon, to the lower edge 25 of core 22' including any coating(s) thereon (denoted by depth X) in FIG. 1A may be calculated as follows: D=0.25(X) (i.e., the suitable depth D of the vertical element or spline 12 extends 25% vertically down into the core 22' as measured from the top surface 25A including any coating(s) thereon), D=0.5(X), D=0.75(X), D=0.8(X), and so forth.

Whether the spline 12 is monolithic or constructed of multiple pieces, core 22', including but not limited to, laminations of open celled polyurethane foam 22 (hereinafter may be referred to as "foam 22" for ease of reference which is not meant to limit the core 22' to a foam material, but merely illustrate one exemplary material therefore) are arranged to form laminates 31, which are located on both sides of the spline 12 and are compressed in the gap G between the concrete substrates 50, according to embodiments. The present invention is not limited to the use of polyurethane foams, as other foams are within the scope of the present invention, and other non-foam materials also can be used for the core 22', as explained below. The individual laminations 31A are layers that extend parallel and in the direction in which the joint extends and along the length thereof and are constructed by infusing at least one, e.g., an inner lamination with an amount of fire retardant material 60. However, the structures of the present invention are also not limited in this regard as, e.g., the foam 22 and/or core 22' may comprise a block of non-laminated foam or other material of fixed size depending upon the desired joint size, a laminate comprising laminations oriented perpendicular to the direction in which the joint extends, or combinations of the foregoing.

Thus, foam 22 merely illustrates one suitable material for the core 22'. Accordingly, examples of materials for the core 22' include, but are not limited to, foam, e.g., polyurethane foam and/or polyether foam, and can be of an open cell or dense, closed cell construction. Further examples of materials for the core 22' include paper based products, cardboard, metal, plastics, thermoplastics, dense closed cell foam including polyurethane and polyether open or closed cell foam, cross-linked foam, neoprene foam rubber, urethane, ethyl vinyl acetate (EVA), silicone, a core chemistry (e.g., foam chemistry) which inherently imparts hydrophobic and/or fire resistant characteristics to the core; and/or composites. Combinations of any of the foregoing materials or other suitable materials also can be employed. It is further noted that while foam 22 is primarily referred to herein for the core 22', the descriptions for foam 22 also apply to other materials for the core 22', as explained above.

Because the amounts of foam 22 and/or core 22' that are located on either side of the spline 12 are substantially equal and subject to substantially the same environmental conditions, according to embodiments, the force of the compressed foam 22 and/or core 22' as it expands on one side of the spline 12 is substantially equal to the force of the compressed foam 22 and/or core 22' exerted on the other side of the spline, according to embodiments. Thus, once installed, the system 10 is generally in equilibrium, and the spline 12 is self-centering within the gap between the concrete substrates 50. The cover plate 14, which overlies the gap between the substrates 50 and generally completely covers the gap, is preferably centered with respect to the spline 12.

The core 22' can be infused with a suitable material including, but not limited to, an acrylic, such as a water-based acrylic chemistry, a wax, a fire retardant material, ultraviolet (UV) stabilizers, and/or polymeric materials, combinations thereof, and so forth. A particularly suitable embodiment is a core 22' comprising an open celled foam infused with a water-based acrylic chemistry and/or a fire retardant material.

The core 22' and/or at least one lamination of the foam 22/core 22' may be infused with a fire retardant material 60 to form the defined expansion joint. The amount of fire retardant material 60 infused into the core 22', including, e.g., the open celled foam embodiment is between 3.5:1 and 4:1 in ratio with the un-infused foam/core itself by weight, according to embodiments. The resultant uncompressed foam/core whether comprising a solid block or laminates, has a density of about 130 kg/m$^3$ to about 150 kg/m$^3$ and preferably about 140 kg/m$^3$. Other suitable densities for the resultant core 22' include between about 50 kg/m$^3$ and about 250 kg/m$^3$, e.g., between about 100 kg/m$^3$ and about 180 kg/m$^3$, and which are capable of providing desired water resistance and/or water proofing characteristics to the structure.

One type of fire retardant material 60 that may be used is water-based aluminum tri-hydrate (also known as aluminum tri-hydroxide (ATH)). The present invention is not limited in this regard, however, as other fire retardant materials may be used. Such materials include, but are not limited to, metal oxides and other metal hydroxides, aluminum oxides, antimony oxides and hydroxides, iron compounds, iron compounds such as ferrocene, molybdenum trioxide, nitrogen-based compounds, phosphorous based compounds, halogen based compounds, halogens, e.g., fluorine, chlorine, bromine, iodine, astatine, combinations of any of the foregoing materials, and other compounds capable of suppressing combustion and smoke formation.

In the system 10, several laminations of the foam or other suitable material, the number depending on the desired size of the expansion joint, are compiled and then compressed. For example, the spline 12 is placed on an end surface of the compiled laminations, and several additional laminations are compiled and placed on the spline and compressed. The entire core/spline/core (e.g., foam/spline/foam) assembly is held at compression in a suitable fixture. Similarly, a core 22' comprising laminations of non-foam material or comprising a solid block of desired material may be compiled and then compressed and held at such compression in a suitable fixture. The fixture is at a width slightly greater than that which the expansion joint is anticipated to experience at the largest possible movement of the adjacent concrete surfaces. At this width, the infused foam laminate or core 22' is coated with a coating, such as a waterproof elastomer 24 at one surface (e.g., on the top side), according to embodiments. This waterproof elastomer may be a polysulfide, silicone, acrylic, polyurethane, poly-epoxide, silyl-terminated polyether, a formulation of one or more of the foregoing materials with or without other elastomeric components or similar suitable elastomeric coating or liquid sealant materials, or a mixture, blend, or other formulation of one or more of the foregoing. One preferred elastomer coating for application to a horizontal deck where vehicular traffic is expected is Pecora 301, which is a silicone pavement sealant available from Pecora Corporation of Harleysville, Pa. Another preferred elastomeric coating is Dow Corning 888, which is a silicone joint sealant available from Dow Corning Corporation of Midland, Mich. Both of the foregoing elastomers are traffic grade rated sealants. For vertically-oriented expansion joints, exemplary preferred elastomer coatings include Pecora 890, Dow Corning 790, and Dow Corning 795.

Depending on the nature of the adhesive characteristics of the elastomer 24, a primer may be applied to the outer surfaces of the laminations of foam 22 and/or core 22' prior to the coating with the elastomer 24. Applying such a primer may facilitate the adhesion of the elastomer 24 to the foam 22 and/or core 22'.

The elastomer 24 is tooled to create a "bellows" profile (or a similar profile) such that the elastomeric material can be compressed in a uniform and aesthetic fashion while being maintained in a virtually tensionless environment.

The surface of the laminate 31 and/or core 22' opposite the surface coated with the waterproofing elastomer 24 (the bottom side) is coated with an intumescent material 26, according to embodiments. One preferred intumescent material 26 is 3M CP25WB+, which is a fire barrier caulk. Both the coating of the elastomer 24 and the intumescent material 26 are cured in place on the foam 22 and/or core 22' while the infused foam lamination/core is held at the prescribed compressed width. After the elastomer 24 and the intumescent material 26 have been cured, the entire composite and spline assembly is removed from the fixture, optionally compressed to less than the nominal size of the material, and packaged for shipment to the job site. This first embodiment is suited to horizontal parking deck applications where waterproofing is desired on the top side and fire resistance is desired from beneath.

In this system 10, a sealant band and/or corner bead 13 of the elastomer 24 can be applied on the side(s) of the interface between the foam laminate/core and the concrete substrate 50 to create a water tight seal. On the opposite side, a sealant band and/or corner bead 23 of the intumescent material 16 can be similarly applied to create a homogeneous intumescent face on the fire resistant side.

Figure 2:
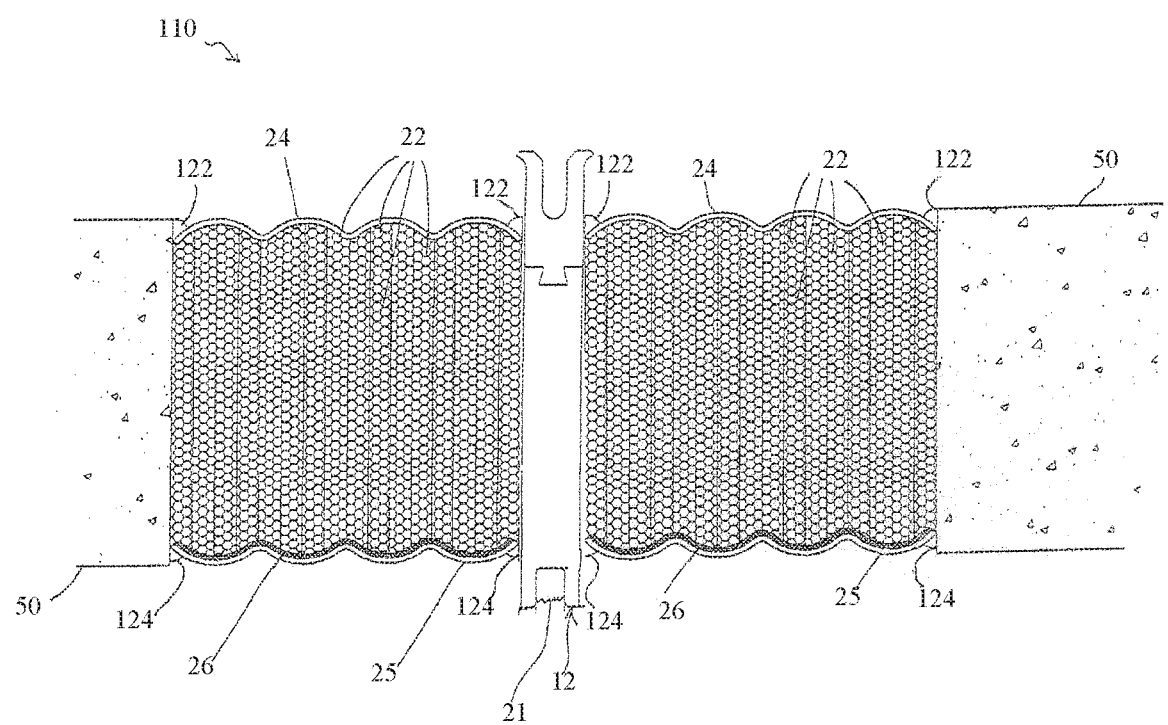
FIG. 2 is a schematic view of another embodiment of an expansion joint system of the present invention.

Referring now to FIG. 2, an alternate expansion joint system 110 of the present invention includes two portions of core 22' and/or foam 22 disposed on either side of the spline 12. The spline 12 may be monolithic or constructed of multiple pieces. The core 22' and/or foam 22 has a first elastomer 24 coated on one surface (e.g., the top side) and the intumescent material 26 coated on an opposing surface (e.g., the bottom side). A second elastomer 25 is coated on the intumescent material 26 and provides a waterproofing function. In this manner, the system 110 is water resistant in both directions and fire resistant in one direction. The system 110 is used in applications that are similar to the applications in which the system 10 is used, but may be used where water is present on the underside of the expansion joint. Additionally, system 10 would be suitable for vertical expansion joints where waterproofing or water resistance is desirable in both directions while fire resistance is desired in only one direction. The second elastomer 25 may also serve to aesthetically integrate the system 110 with surrounding substrate material.

Sealant bands and/or corner beads 122 of the first elastomer 24 can be applied to the sides as with the embodiment described above. On the opposite side, a band or bead of the intumescent material 26 can be applied between the concrete substrate 50 and the foam lamination/core with any excess being removed. Sealant bands and/or corner beads 124 can be applied on top of the second elastomer 25, thereby creating a water tight seal between the concrete substrate 50 and the intumescent material.

Figure 3:
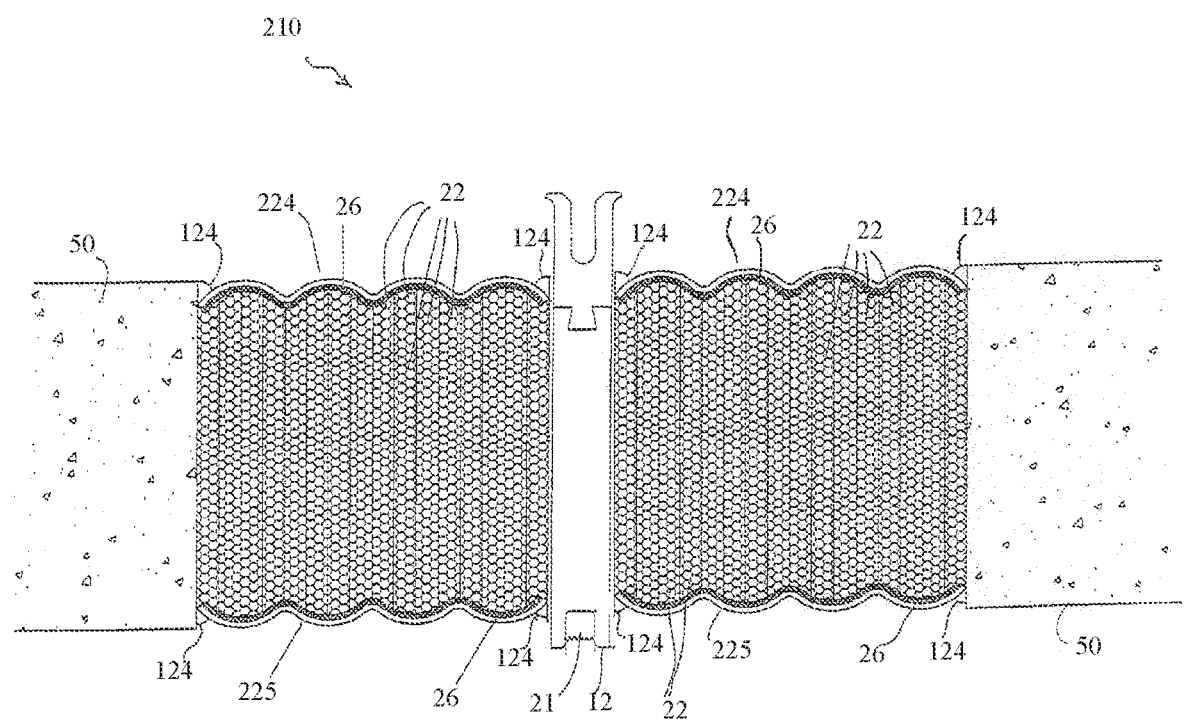
FIG. 3 is a schematic view of another embodiment of an expansion joint system of the present invention.

Referring now to FIG. 3, another expansion joint system of the present invention is shown at 210. In system 210, the core 22' and/or foam 22 is located on either side of the spline 12, which may be monolithic or constructed of multiple pieces. The core 22' and/or foam 22 is similar to or the same as the above-described foam, but both exposed surfaces (the top and bottom sides) are coated first with the intumescent material 26 to define a first coating of the intumescent material on the top side and a second coating of the intumescent material 26 on the bottom side. The first coating of the intumescent material 26 is coated with a first elastomer material 224, and the second coating of the intumescent material 26 is coated with a second elastomer material 225. This system 210 can be used in the same environments as the above-described systems with the added benefit that it is both waterproof or at least water resistant and fire resistant in both directions through the joint. This makes it especially suitable for vertical joints in either interior or exterior applications.

In system 210, sealant bands and/or corner beads of the intumescent material and sealant bands and/or corner beads 124 of the elastomer are applied in a similar fashion as described above and on both sides of the foam 22 and/or core 22'. This creates homogeneous intumescent layers and a water tight elastomer layer above them on both sides of the foam 22 and/or core 22' (on the top side and the bottom side).

Figure 4:
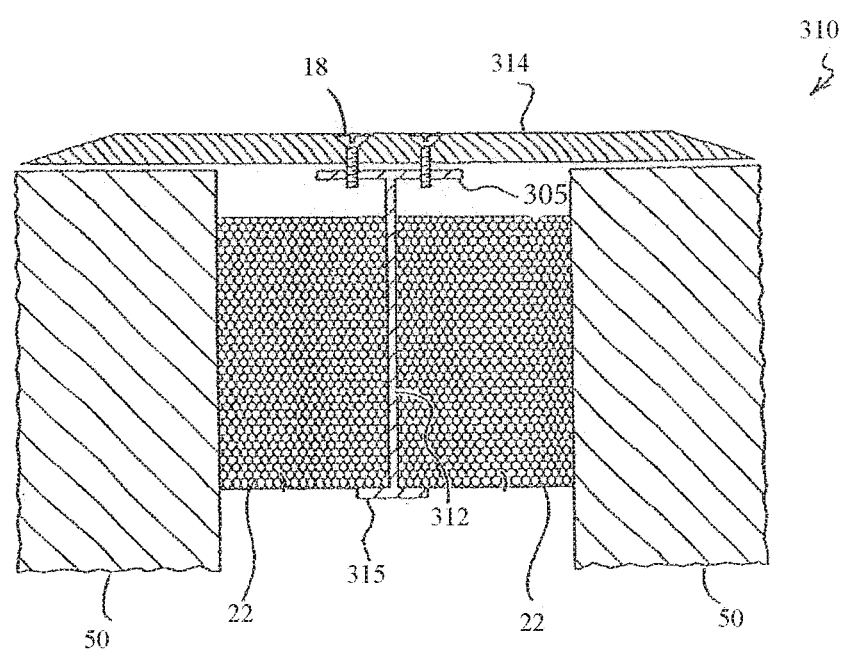
FIG. 4 is a schematic view of another embodiment of an expansion joint system of the present invention.

Referring now to FIG. 4, another embodiment of the expansion joint system is shown at 310 and is hereinafter referred to as "system 310." System 310 includes a spline 312 (similar to spline 5 of the aforementioned U.S. Pat. No. 6,532,708 (FIG. 4)), which is a monolithic element having an I-shaped cross section defined by a vertical member and two horizontally oriented flanges located at either end thereof. Spline 312 provides for both the cover plate anchor and the self-centering mechanism. The present invention is not limited in this regard, however, as the spline 312 may be constructed of multiple pieces. Flanges 305 on the upper end of the spline 312 enable the cover plate 314 to be located on the spline and secured thereto using any suitable fastener 18 (e.g., a screw). The vertical leg of the spline 312 extends into the gap between the concrete substrates 50, and the length thereof depends upon the joint dimensions and the size of the foam 22 and/or core 22' located on either side of the spline 312. The foam 22 and/or core 22' can be defined by any configuration of waterproofing elastomer, intumescent material, and beads as described above. Flanges 315 located on the bottom end of the spline 312 support the foam 22 and/or core 22' and facilitate the retaining of the foam/core in the gap.

Figure 5:
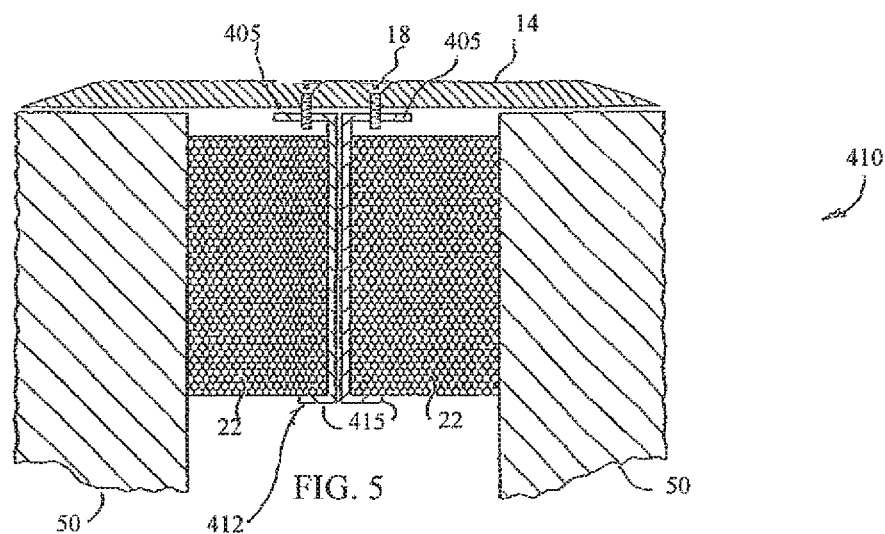
FIG. 5 is a schematic view of another embodiment of an expansion joint system of the present invention.

Referring now to FIG. 5, another embodiment of the expansion joint system is shown at 410 and is hereinafter referred to as "system 410." System 410 compensates for irregularities in joint construction with regard to both horizontal and vertical joint parameters. In other words, the opposing sides of a joint may not be parallel or equidistant from each other. In such a case, the expansion of the foam 22 and/or core 22' incorporated into the joint on one side of the spline 412 may not reflect the same expansion characteristics of the foam on the other side of the spline due to irregularities in width of the gap and/or vertical/horizontal alignment of concrete substrates 50.

In system 410, the spline 412 (which is similar to spline of the aforementioned U.S. Pat. No. 6,532,708 (FIG. 5) comprises two vertical elements positioned back-to-back, each including a top flange 405 and a bottom flange 415. The top flanges 405 are each connected to the cover plate 14 via fasteners 18. The bottom flanges 415 facilitate the support of the foam 22 against the respective vertical element of the spline 412 and the concrete substrate 50. Each top flange 405 can be individually tensioned to the cover plate 14 to allow the portions of foam 22 and/or core 22' on either side of the spline 412 to be adjusted independently so as to enable the foam to rest in the joint in the desired manner. Again, the foam 22 and/or core 22' can be defined by any configuration of waterproofing elastomer, intumescent material, and beads as described above.

Figure 6:
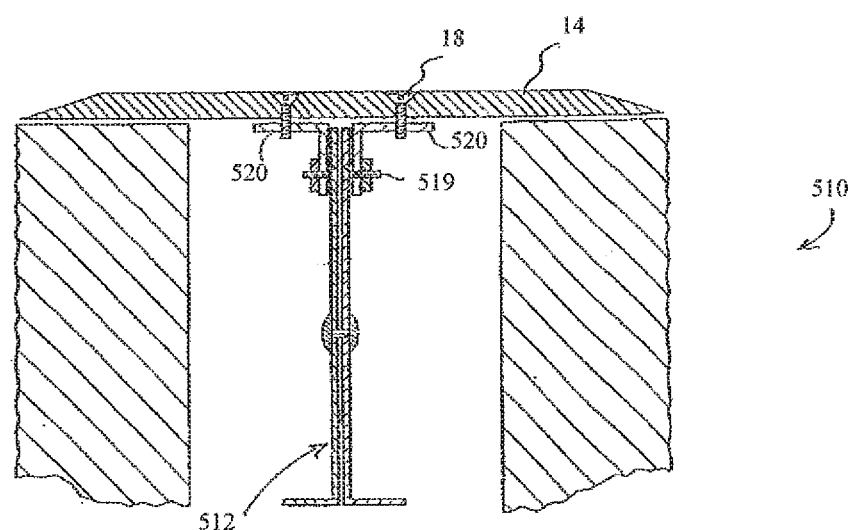
FIG. 6 is a schematic view of another embodiment of an expansion joint system of the present invention.

A system 510 as shown in FIG. 6 comprises a means to adjust the final position of the cover plate 14 relative to vertical elements of a spline 512 (which is similar to spline of the aforementioned U.S. Pat. No. 6,532,708 (FIG. 6)). The means to adjust the cover plate 14 is below the cover plate and comprises a bolt 519 or similar mechanism that extends laterally through both vertical elements of the spline 512 and also through vertical portions of angulated flanges 520 attached to upper ends of the spline. Horizontal portions of the angulated flanges 520 are in turn attached to the cover plate 14 using fasteners 18. The angulated portions 520 are adjustable relative to the vertical portions of the spline 512 by means of vertically-extending slots in the vertical portions and/or the angulated portions themselves, through which the bolt 519 extends, thus allowing each angulated portion to be adjusted and secured to accommodate the foam 22 and/or core 22' and the cover plate 14 to suitably retain the foam 22 and/or core 22'. The foam 22 and/or core 22' is not shown in system 510, but it can be defined by any configuration of waterproofing elastomer, intumescent material, and beads as described above.

Figure 7:
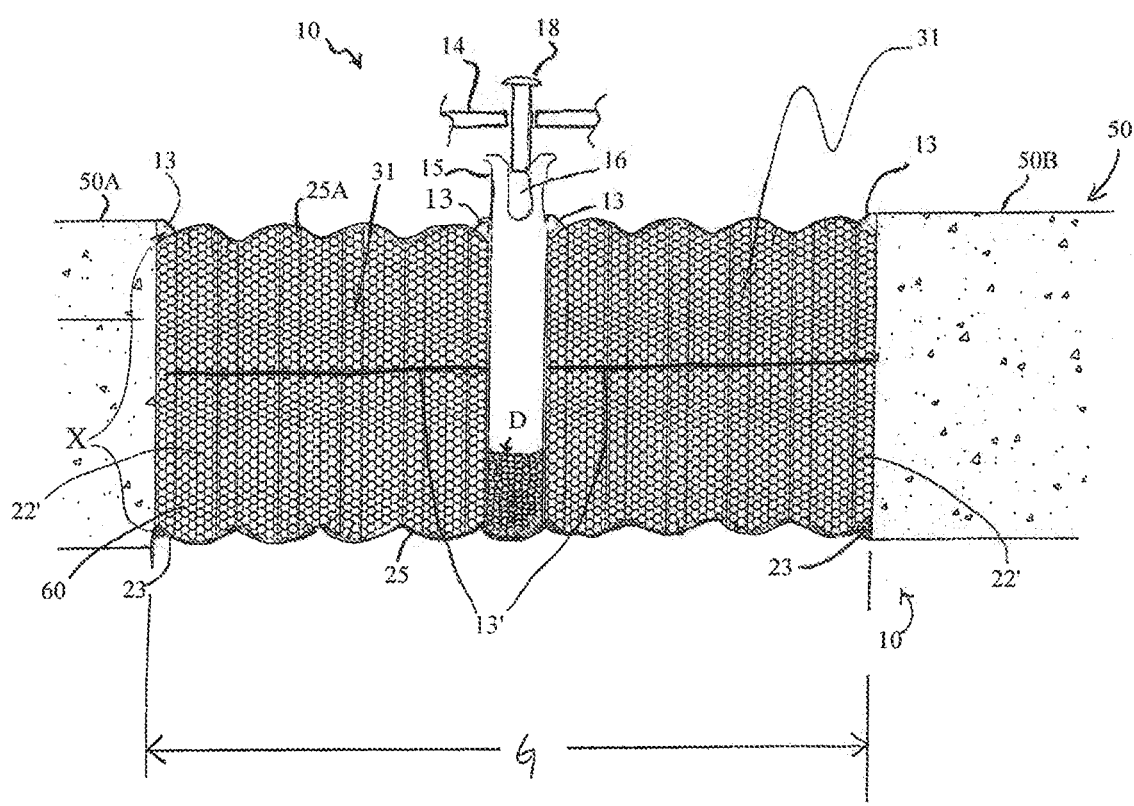
FIG. 7 is a schematic view of another embodiment of an expansion joint system of the present invention.

Referring now to FIG. 7, shown therein is another expansion joint system 10 similar in some respects to the expansion joint system shown in FIG. 1A and described above. Accordingly, like reference numbers refer to like elements. In system 10 of FIG. 7, the core 22' is infused with a fire retardant material, as described above. As an example, the fire retardant material can form a "sandwich type" construction wherein the fire retardant material forms a layer 13', as shown in FIG. 7, between the material of the core 22'. Thus, the layer 13' comprising a fire retardant can be located within the body of the core 22' as, e.g., an inner layer, or lamination infused with a higher ratio or density of fire retardant than the core 22'. It is noted that the term "infused with" as used throughout the descriptions herein is meant to be broadly interpreted to refer to "includes" or "including." Thus, for example, a "core infused with a fire retardant" covers a "core including a fire retardant" in any form and amount, such as a layer, and so forth. Accordingly, as used herein, the term "infused with" would also include, but not be limited to, more particular embodiments such as "permeated" or "filled with" and so forth.

Moreover, it is noted that layer 13' is not limited to the exact location within the core 22' shown in FIG. 7 as the layer 13' may be included at various depths in the core 22' as desired. Moreover, it is further noted that this layer 13' may extend in any direction. For example, layer 13' may be oriented parallel to the direction in which the joint extends, perpendicular to the direction in which the joint extends or combinations of the foregoing. Layer 13' can function as a fire retardant barrier layer within the body of the core 22'. Accordingly, layer 13' can comprise any suitable material providing, e.g., fire barrier properties. No coatings are shown on the outer surfaces of core 22' of FIG. 7.

Accordingly, by tailoring the density as described above to achieve the desired water resistance and/or water proofing properties of the structure, combined with the infused fire retardant in layer 13' or infused within the core 22' in any other desired foam including a non-layered form, additional layers, e.g., an additional water and/or fire resistant layer on either surface or both outer surfaces of the core 22' are not necessary to achieve a dual functioning water and fire resistant expansion and seismic joint system, according to embodiments.

It is noted, however, that additional layers could be employed if desired in the embodiment of FIG. 7, as well as in the other embodiments disclosed herein, and in any suitable combination and order. For example, the layering described above with respect to any/all of FIGS. 1-6 could be employed in the embodiment of FIG. 7 and/or FIG. 8 described below.

Figure 8:
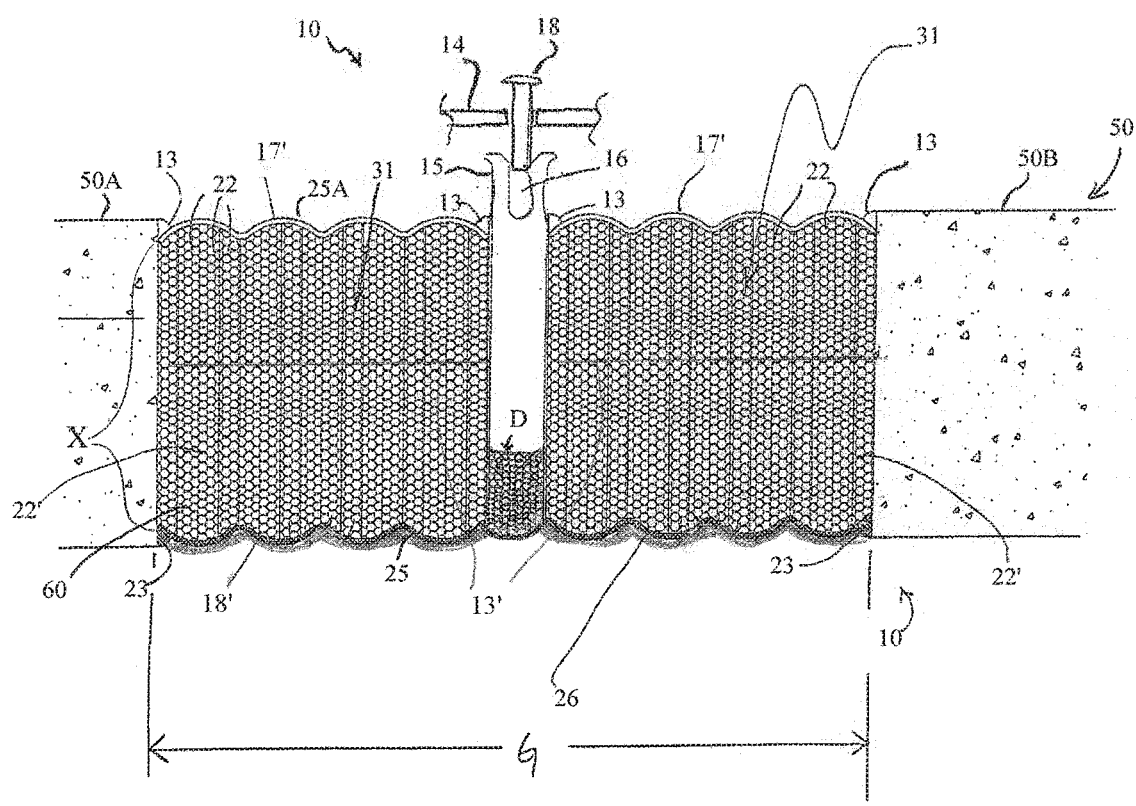
FIG. 8 is a schematic view of another embodiment of an expansion system of the present invention.

As a further example, FIG. 8 illustrates therein another system 10 comprising the layer 13' comprising a fire retardant within the body of the core 22' as described above with respect to FIG. 7, and also comprising an additional coating 17' on a surface of the core 22'. Coating 17' can comprise any suitable coating, such as the elastomer 24 described above, a fire barrier material including an intumescent material described above or other suitable fire barrier material, e.g., a sealant, a fabric, a blanket, a foil, a tape, e.g., an intumescent tape, a mesh, a glass, e.g., fiberglass; and combinations thereof.

Moreover, embodiments include various combinations of layering and fire retardant infusion (in layer and non-layer form) to achieve, e.g., a dual functional water and fire resistant expansion and seismic joint systems described herein. For example, FIG. 8, illustrates coating 17' on one surface of the core 22' and a dual coating 18' on the opposite surface of the core 22'. The dual coating 18' can comprise, e.g., an inner layer of elastomer 24, as described above, with an outer layer of a fire barrier material including, e.g., an intumescent material. Similarly, the layers of dual coating 18' can be reversed to comprise an inner layer of fire barrier material, and an outer layer of elastomer 24.

Alternatively, only one layer may be present on either surface of core 22', such as one layer of a fire barrier material, e.g., sealant, on a surface of the core 22', which is infused with a fire retardant material in layer 13' or infused in a non-layer form. Still further, other combinations of suitable layering include, e.g., dual coating 18' on both surfaces of the core 22' and in any combination of inner and outer layers, as described above.

It is additionally noted that the embodiments shown in FIGS. 7 and 8 can be similarly constructed, as described above with respect to, e.g., FIGS. 1-3, modified as appropriate for inclusion/deletion of various layering and so forth. Thus, for example, as described above, while a "bellows" constructions is illustrated by some of the figures set forth herein, the embodiments described herein are not limited to such a profile as other suitable profiles may be employed, such as straight, curved, and so forth.

Accordingly, as further evident from the foregoing, embodiments of the dual functioning water and fire resistant expansion and seismic joint systems can comprise various ordering and layering of materials on the outer surface of the core 22'. Similarly, a fire retardant material can be infused into the core 22' in various forms to crate, e.g., a layered "sandwich type" construction with use of layer 13'.

Similarly, the variations described above can apply to both the afore-described one-piece, as well as multiple piece spline 12.

In each of the embodiments described herein, the infused foam laminate and/or core 22' may be constructed in a manner such that the density of fire retardant is consistent in the foam 22 and/or core 22' regardless of the final size of the product, according to embodiments. The starting density of the infused foam/core is approximately 140 kg/m$^3$, according to embodiments. Other densities includes between about 80 kg/m$^3$ and about 180 kg/m$^3$. After compression, the infused foam/core density is in the range of about 160-800 kg/m$^3$, according to embodiments. After installation the laminate and/or core 22' will typically cycle between densities of approximately 750 kg/m$^3$ at the smallest size of the expansion joint to approximately 360-450 kg/m$^3$, e.g., approximately 400-450 kg/m$^3$ (or less) at the maximum size of the joint. A density of 400-450 kg/m$^3$ was determined through experimentation, as a reasonable value which still affords adequate fire retardant capacity, such that the resultant foam can pass the UL 2079 test program. The present invention is not limited to cycling in the foregoing ranges, however, and the foam/core may attain densities outside of the herein-described ranges.

In expansion joint systems employing any of the systems as described herein, installation is accomplished by adhering the foam laminate and/or core 22' to the concrete substrate 50 using an adhesive such as epoxy, according to embodiments. The epoxy or other adhesive is applied to the faces of the expansion joint prior to removing the core/spline/core (e.g., foam/spline/foam) assembly from the packaging thereof (such packaging may comprise restraining elements, straps, ties, bands, shrink wrap plastic, or the like). Once the packaging has been removed, the foam laminate and/or core 22' will begin to expand, and it should be inserted into the joint in the desired orientation. Once the foam lamination and/or core 22' has expanded to suit the expansion joint, it will become locked in by the combination of the foam 22 and/or core 22' back pressure and the adhesive. If a cover plate is installed, the cover plate can further facilitate the retention of the foam lamination in place in the joint.

In vertical expansion joint systems employing any of the systems as described herein, an adhesive may be pre-applied to the core/spline/core (e.g., foam/spline/foam) assembly. In this case, for installation, the assembled foam laminate/core and spline with the pre-applied adhesive is removed from the packaging and inserted into the space between the concrete surfaces to be joined where it is allowed to expand to meet the concrete substrate. Once this is done, the adhesive in combination with the back pressure of the foam 22 and/or core 22' will hold the foam 22 and/or core 22' in position. The cover plate can then be attached to the spline 12.

To fill an entire expansion joint, the installation as described above is repeated as needed. To join the end of one foam laminate and/or core 22' to the end of another in either the horizontal configuration or the vertical configuration, a technique similar to that used with the sealant band and/or corner beads can be employed. After inserting one section of a system (joint) and adhering it securely to the concrete substrate, the next section is readied by placing it in proximity to the first section. A band or bead of the intumescent material and the elastomer material is applied on the end of the foam laminate in the appropriate locations. The next section is removed from the packaging and allowed to expand in close proximity to the previously installed section. When the expansion has taken place and the section is beginning to adhere to the substrates (joint faces), the section is firmly seated against the previously installed section. The outside faces are then tooled to create an aesthetically pleasing seamless interface.

The above mentioned installation procedure is simple, rapid, and has no invasive elements which impinge upon or penetrate the concrete (or other) substrates. This avoids many of the long term problems associated with invasive anchoring of screws into expansion joint faces.

Thus, according to embodiments, disclosed is an expansion joint system. The system comprises: a cover plate; a spline attached to the cover plate; and a core having a fire retardant material included therein in an amount effective to pass testing mandated by UL 2079. The spline depends from the cover plate and is configured to be positioned in a gap between substrates such that the cover plate overlies the gap. The core is compressible between a first face of the spline and one of the substrates and is compressible between a second face of the spline and the other of the substrates, and the expansion joint system is configured to facilitate compression of the core when installed between the substrates by repeatedly expanding and contracting to accommodate movement of the substrates; and the core with the fire retardant material included therein is configured to pass the testing mandated by UL 2079. According to aspects of the invention, i) the core with the fire retardant material included therein has a density when compressed in a range of about 160 kg/m$^3$ to about 800 kg/m$^3$; and/or ii) the fire retardant material included in the core is selected from the group consisting of water-based aluminum tri-hydrate, metal oxides, metal hydroxides, aluminum oxides, antimony oxides and hydroxides, iron compounds, ferrocene, molybdenum trioxide, nitrogen-based compounds, phosphorus based compounds, halogen based compounds, halogens, and combinations of the foregoing materials; and/or iii) comprises a fire barrier sealant layer; and/or iv) comprises a water resistant layer on the core; and/or v) wherein the core with the fire retardant material included therein has a density when uncompressed in a range of about 50 kg/m$^3$ to about 250 kg/m$^3$; and/or vi) the system is configured to maintain fire resistance upon exposure to a temperature of about 540° C. at about five minutes; and/or vii) the system is configured to maintain fire resistance upon exposure to a temperature of about 930° C. at about one hour; and/or viii) the system is configured to maintain fire resistance upon exposure to a temperature of about 1010° C. at about two hours; and/or ix) the system is configured to maintain fire resistance upon exposure to a temperature of about 1052° C. at about three hours; and/or x) the system is configured to maintain fire resistance upon exposure to a temperature of about 1093° C. at about four hours; and/or xi) the system is configured to maintain fire resistance upon exposure to a temperature of about 1260° C. at about eight hours; and/or xii) the core comprises at least one of polyurethane foam, polyether foam, open cell foam, dense closed cell foam, cross-linked foam, neoprene foam rubber, urethane, cardboard, and a composite; and/or xiii) a layer comprising the fire retardant material is sandwiched between material of the core, and the core is not coated with any fire retardant material on any outer surface of the core; and/or xiv) a layer comprising the fire retardant material is sandwiched between material of the core; and/or xv) the layer is oriented, with respect to a direction in which the joint extends in its width, in at least one of a parallel orientation, a perpendicular orientation, and a combination thereof; and/or the fire retardant material is permeated throughout the core.

It is further noted that the various embodiments, including constructions, layering and so forth described herein, can be combined in any combination and in any order. Thus, the embodiments described herein are not limited to the specific construction of the figures, as the various materials, layering and so forth described herein can be combined in any desired combination and order.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. An expansion joint system, comprising:
    a cover plate;
    a spline attached to the cover plate; and
    a core having a fire retardant material permeated in the core by infusing the fire retardant material within the core, the core with the fire retardant material therein configured to have a compressed density effective to pass testing as provided by UL 2079;
    wherein the spline depends from the cover plate and is configured to be positioned in a gap between substrates such that the cover plate overlies the gap;
    wherein the core with the fire retardant material therein is compressible between a first face of the spline and one of the substrates and is compressible between a second face of the spline and the other of the substrates, and the expansion joint system is configured to facilitate compression of the core with the fire retardant material therein between the substrates by repeatedly expanding and contracting to accommodate movement of the substrates; and
    wherein the core with the fire retardant material therein is configured to withstand exposure to a temperature of about 540° C. at about five minutes.

2. The expansion joint system of claim 1, wherein the core with the fire retardant material permeated in the core has a density when compressed in a range of about 160 kg/m$^3$ to about 800 kg/m$^3$.

3. The expansion joint system of claim 1, wherein the fire retardant material permeated in the core is selected from the group consisting of water-based aluminum tri-hydrate, metal oxides, metal hydroxides, aluminum oxides, antimony oxides and hydroxides, iron compounds, ferrocene, molybdenum trioxide, nitrogen-based compounds, phosphorus based compounds, halogen based compounds, halogens, and combinations of the foregoing materials.

4. The expansion joint system of claim 1, further comprising a fire barrier sealant layer.

5. The expansion joint system of claim 1, further comprising a water resistant layer on the core.

6. The expansion joint system of claim 5, wherein the water resistant layer on the core is selected from the group consisting of a polysulfide, silicone, acrylic, polyurethane, poly-epoxide, silyl-terminated polyether, and combinations of one or more of the foregoing.

7. The expansion joint system of claim 1, wherein the core with the fire retardant material permeated in the core has a density when uncompressed in a range of about 50 kg/m$^3$ to about 250 kg/m3.

8. The expansion joint system of claim 1, wherein the system is configured to maintain fire resistance upon exposure to a temperature of about 930° C. at about one hour.

9. The expansion joint system of claim 1, wherein the system is configured to maintain fire resistance upon exposure to a temperature of about 1010° C. at about two hours.

10. The expansion joint system of claim 1, wherein the system is configured to maintain fire resistance upon exposure to a temperature of about 1052° C. at about three hours.

11. The expansion joint system of claim 1, wherein the system is configured to maintain fire resistance upon exposure to a temperature of about 1093° C. at about four hours.

12. The expansion joint system of claim 1, wherein the system is configured to maintain fire resistance upon exposure to a temperature of about 1260° C. at about eight hours.

13. The expansion joint system of claim 1, wherein the core comprises at least one of polyurethane foam, polyether foam, open cell foam, dense closed cell foam, cross-linked foam, neoprene foam rubber, urethane, ethyl vinyl acetate, silicone, cardboard, and a composite.

14. The expansion joint system of claim 1, further comprising a layer comprising the fire retardant material is disposed in the core, and the core is not coated with any fire retardant material on any outer surface of the core.

15. The expansion joint system of claim 1, further comprising a layer comprising the fire retardant material is disposed in the core.

16. The expansion joint system of claim 15, wherein the layer is oriented, with respect to a direction in which the joint extends in its width, in at least one of a parallel orientation, a perpendicular orientation, and a combination thereof.

17. The expansion joint system of claim 1, wherein the fire retardant material is permeated throughout the core.

18. The expansion joint system of claim 1, wherein the core is selected from the group consisting of foam, a paper based product, cardboard, metal, plastic, thermoplastic, and combinations thereof.

19. The expansion joint system of claim 1, wherein the core is selected from the group consisting of a plurality of laminations and a solid block.

20. The expansion joint system of claim 1, further including at least one of an acrylic, a water-based acrylic chemistry, a wax, ultraviolet stabilizers, polymeric materials, and combinations thereof, disposed in the core.

21. The expansion joint system of claim 1, wherein the spline is at least partially comprised of non-conductive material.

22. The expansion joint system of claim 1, wherein the spline includes an upper portion and a lower portion, and the lower portion is comprised of non-conductive material.

23. The expansion joint system of claim 1, wherein the spline extends vertically downward from the cover plate and into the core to a depth less than a full vertical depth of the core.

24. The expansion joint system of claim 23, wherein the core with the fire retardant material therein comprises a first portion, a second portion and a third portion, wherein the first portion is compressible between the first face of the spline and the one of the substrates, the second portion is compressible between the second face of the spline and the other of the substrates, and the third portion is disposed below the spline.

25. The expansion joint system of claim 1, wherein the spline extends vertically downward from the cover plate and into the core to a depth at least to a full vertical depth of the core.

26. An expansion joint system, comprising:
a cover plate;
a spline attached to the cover plate; and
a core having a fire retardant material included in the core, the core with the fire retardant material therein configured to have a compressed density effective to pass testing as provided by UL 2079;
wherein the spline depends from the cover plate and is configured to be positioned in a gap between a first substrate and a second substrate such that the cover plate overlies the gap;
wherein the core with the fire retardant material therein is compressible between a first face of the spline and the first substrate and is compressible between a second face of the spline and the second substrate, and the expansion joint system is configured to facilitate compression of the core with the fire retardant material therein between the first substrate and the second substrate by repeatedly expanding and contracting to accommodate movement of at least one of the first substrate and the second substrate; and
wherein the core with the fire retardant material therein is configured to withstand exposure to a temperature of about 540° C. at about five minutes.

27. The expansion joint system of claim 26, wherein the core with the fire retardant material therein has an uncompressed density in a range of about 50 kg/m³ to about 250 kg/m³.

28. The expansion joint system of claim 26, wherein the core with the fire retardant material therein has a compressed density in a range of about 160 kg/m³ to about 800 kg/m³.

29. The expansion joint system of claim 26, further comprising a fire barrier sealant layer on the core.

30. The expansion joint system of claim 26, further comprising a water resistant layer on the core.

31. The expansion joint system of claim 26, wherein the water resistant layer on the core is selected from the group consisting of a polysulfide, silicone, acrylic, polyurethane, poly-epoxide, silyl-terminated polyether, and combinations of one or more of the foregoing.

32. The expansion joint system of claim 26, wherein the core is selected from the group consisting of foam, a paper based product, cardboard, metal, plastic, thermoplastic, and combinations thereof.

33. The expansion joint system of claim 26, wherein the core comprises at least one of polyurethane foam, polyether foam, open cell foam, dense closed cell foam, cross-linked foam, neoprene foam rubber, urethane, ethyl vinyl acetate, silicone, cardboard, and a composite.

34. The expansion joint system of claim 26, wherein the core is selected from the group consisting of a plurality of laminations and a solid block.

35. The expansion joint system of claim 26, wherein the fire retardant material introduced in the core is selected from the group consisting of water-based aluminum tri-hydrate, metal oxides, metal hydroxides, aluminum oxides, antimony oxides and hydroxides, iron compounds, ferrocene, molybdenum trioxide, nitrogen-based compounds, phosphorus based compounds, halogen based compounds, halogens, fluorine, chlorine, bromine, iodine, astatine, and combinations of the foregoing materials.

36. The expansion joint system of claim 26, further comprising a layer comprising the fire retardant material is disposed in the core.

37. The expansion joint system of claim 36, wherein the layer is oriented, with respect to a direction in which the joint extends in its width, in at least one of a parallel orientation, a perpendicular orientation, and a combination thereof.

38. The expansion joint system of claim 26, wherein the system is configured to maintain fire resistance upon exposure to a temperature of about 930° C. at about one hour.

39. The expansion joint system of claim 26, wherein the system is configured to maintain fire resistance upon exposure to a temperature of about 1010° C. at about two hours.

40. The expansion joint system of claim 26, wherein the system is configured to maintain fire resistance upon exposure to a temperature of about 1052° C. at about three hours.

41. The expansion joint system of claim 26, wherein the system is configured to maintain fire resistance upon exposure to a temperature of about 1093° C. at about four hours.

42. The expansion joint system of claim 26, further including at least one of an acrylic, a water-based acrylic chemistry, a wax, ultraviolet stabilizers, polymeric materials, and combinations thereof, disposed in the core.

43. The expansion joint system of claim 26, wherein the spline is at least partially comprised of non-conductive material.

44. The expansion joint system of claim 26, wherein the spline extends vertically downward from the cover plate and into the core to a depth less than a full vertical depth of the core.

45. The expansion joint system of claim 44, wherein the core with the fire retardant material therein comprises a first portion, a second portion and a third portion, wherein the first portion is compressible between the first face of the spline and the first substrate, the second portion is compressible between the second face of the spline and the second substrate, and the third portion is disposed below the spline.

46. An expansion joint system, comprising:
   a cover plate;
   a spline attached to the cover plate; and
   a core having a fire retardant material introduced in the core by filling the core, the core with the fire retardant material therein configured to have a compressed density effective to pass testing as provided by UL 2079;
   wherein the spline depends from the cover plate and is configured to be positioned in a gap between a first substrate and a second substrate such that the cover plate overlies the gap;
   wherein the core with the fire retardant material therein is compressible between a first face of the spline and the first substrate and is compressible between a second face of the spline and the second substrate, and the expansion joint system is configured to facilitate compression of the core with the fire retardant material therein between the first substrate and the second substrate by repeatedly expanding and contracting to accommodate movement of at least one of the first substrate and the second substrate; and
   wherein the core with the fire retardant material therein is configured to withstand exposure to a temperature of about 540° C. at about five minutes.

47. The expansion joint system of claim 46, wherein the core with the fire retardant material therein has a compressed density in a range of about 160 kg/m³ to about 800 kg/m³.

48. The expansion joint system of claim 46, further comprising a fire barrier sealant layer on the core.

49. The expansion joint system of claim 46, further comprising a water resistant layer on the core.

50. The expansion joint system of claim 46, wherein the system is configured to maintain fire resistance upon exposure to a temperature of about 930° C. at about one hour.

51. The expansion joint system of claim 46, wherein the system is configured to maintain fire resistance upon exposure to a temperature of about 1093° C. at about four hours.

52. The expansion joint system of claim 46, further comprising a layer comprising the fire retardant material is disposed in the core.

* * * * *